United States Patent [19]

Birk et al.

[11] Patent Number: 4,922,407
[45] Date of Patent: May 1, 1990

[54] MODULAR ELECTRONIC TIMER SWITCH SYSTEM

[75] Inventors: Daniel J. Birk, Aurora; Kenneth R. Fenne, Glen Ellyn; Michael T. Mantzke, Aurora, all of Ill.

[73] Assignee: Pittway Corporation, Northbrook, Ill.

[21] Appl. No.: 163,521

[22] Filed: Mar. 2, 1988

[51] Int. Cl.$^5$ .............................................. G05D 7/06
[52] U.S. Cl. ................................. 364/145; 364/146; 364/144; 361/394
[58] Field of Search ................... 364/141, 143–146, 364/420; 307/141, 141.4; 361/393, 394, 395, 392

[56] References Cited

U.S. PATENT DOCUMENTS

| | | | |
|---|---|---|---|
| 4,418,333 | 11/1983 | Schwarzbach et al. | 364/146 |
| 4,534,012 | 8/1985 | Yokozawa | 364/146 |
| 4,677,541 | 6/1987 | Singhi | 364/145 |
| 4,722,478 | 2/1988 | Fletcher et al. | 364/420 |
| 4,797,820 | 1/1989 | Wilson et al. | 364/420 |
| 4,815,011 | 3/1989 | Mijuno et al. | 364/188 |

FOREIGN PATENT DOCUMENTS 8605945  10/1986  Australia .............................. 239/69

*Primary Examiner*—John R. Lastova
*Attorney, Agent, or Firm*—Dressler, Goldsmith, Shore, Sutker & Milnamow, Ltd.

[57] ABSTRACT

Each of several, typically three, microprocessorcontrolled modular electronic timers is selectably electrically pluggable to each of several, typically four, custom packaged modular switches. Each modular switch contains an indentical switch circuit that selectively implements the SPST through 4PST, the DPDT, or the DPST switch function. Each modular timer variously provides eight on/off events, either upon five weekdays and upon two weekend days, or upon individual days. Each modular timer may skip timed events during a one to seven day period. An astronomical timer generates an on/off signal at local sunrise and sunset without reference to ambient light conditions. Each timer is readily programmed, and toggled in its on/off signal state, by pushbutton switches. A comprehensive display shows current programmed data and on/off signal status. Each modular switch typically has two pairs of relays that are oppositely controlled. Solely by external electrical connections to the terminals of these relays, and by a further internal jumper particularly in order to realize the 3PST and 4PST switching functions, the same switch circuit is used in all four custom packagings. The custom packagings of the modular switch provide for easy installation while the common switch circuit accords reliable performance of diverse switching functions.

21 Claims, 16 Drawing Sheets

MODULAR ELECTRONIC TIMER SWITCH SYSTEM

FIELD OF THE INVENTION

The present invention concerns electronic timers that make and break electrical switch connections at certain programmably predetermined times.

BACKGROUND OF THE INVENTION

Time-controlled electrical switches are in widespread use. Such time switches may be used to selectively and controllably enable and disable electrical conduction paths of diverse natures, including conduction paths transmitting communication signals. Such switches are most often used, however, to selectively enable and disable the application of power, typically A.C. power but potentially D.C. power, from a power source to a load. In this application, time switches may be used to selectively energize and de-energize loads periodically, from time to time, and/or at certain times of certain days. Energization of loads such as electrical lights and electrical machinery at selected times for selected periods is often appropriate to the intended use of such loads, the intended duty cycle of such loads, and/or the energization of the loads during non-peak electrical usage periods in order to reduce the cost of purchased power.

Electrically and electronically timed electrical switch systems are known in the prior art. These systems generally, however, suffer from certain limitations. Typically, customized timers of specialized capabilities are required for diverse applications. Particularly, timers of the 24-hour type, the 7-day type, with and without ability to skip control functions on a certain day or days, and the 24-hour diurnal astronomical event type (e.g. sunrise and sunset) are variously required.

Meanwhile, the electrical switching function that is desired to be performed by timed electrical switch systems is also variable. Particularly, the single pole single throw (SPST) switch function ranging to the multiple pole single throw (MPST) switch function, and the double pole double throw (DPDT) switch function are each, in various applications, desired to be performed. The proliferation of both specialized timers and specialized switching functions controllable by such timers has resulted in a large proliferation of common, National Electrical Manufacturers Association-recognized, timed electrical switches. For example, some electrical supply organizations stock numerous different timed electrical switches. It would be desirable if inventory carrying costs could be reduced by some form of modular timer system that accorded diverse, semi-custom, timing and switching functions by the convenient assembly of a limited number of modular components.

The electrical and electronic timer switches of the prior art that were generally designed and used for a particular application have generally not exhibited a uniform electrical connection. In particular, each one of a great number of individual switch units in the prior art was normally packaged with supportive documentation concerning its particular and often unique connection in an electrical circuit to variously individually function as an SPST, DPST, or DPDT switch. The prior art units did exhibit indicia near their terminal blocks or other electrical connection areas to aid the electrician in their installation. However, because the units were substantially non-standard, it was difficult for the electrician installer to learn, and remember, any uniform procedure of electrically connecting the different units even when some originated from the same manufacturer. Accordingly, if all SPST to MPST switches, and all DPDT switches were to each be connectable in a uniform manner, the efficiency of switch installation would be improved while the propensity for dangerous and fire-inducing miswires would be reduced.

The electrical and electronic switches of the prior art that were generally designed and used for a particular application have also generally not exhibited an advanced, user-friendly, interface. A user interface is required in a timer switch for its initial setup including time-of-day in a particular control application, and for subsequent programming of the timer unit with event time information for use in control of the timed electrical switch function. The difficulty of programming, and reprogramming, control sequences within prior art electrical and electronic timer switches has often caused the initial setup, and revision(s), of the time sequenced control within these timer switches to be a laborious task requiring considerable skill to perform. For example, prior art electrical switches often use pins or other electrical contacts which had to be laboriously positioned by the person programming the time control sequence of the timer switch unit. This task is often intricate and performed within small dimensions. This task must also be performed in poorly-lit or environmentally hostile conditions, and is not readily subject to verification.

An example of user-friendly interfaces for the control of a programmable timer unit are those user interfaces presented by electronic timers normally associated with videocassette recorders and televisions. The timer control section of these high-cost electronic appliances is primarily directed to permitting the user to program such appliances for the selective viewing and recording of television broadcasts.

The user interfaces of VCR's and televisions have improved in sophistication from certain early user control interfaces which were quite intricate in the required sequence of data insertion, difficult for the consumer-user to understand or memorize, and incapable of allowing the user to easily verify that the desired time control sequence had indeed been entered. Certain more sophisticated modern units operate on a request-response basis with the user. Current user-entered timer control information is consistently displayed in an intelligible manner, sometimes by an expanded alphanumerics display upon the television screen. The prior art userfriendly timed event programming procedures that are appropriate to VCRs and televisions are not, however, appropriate in many respects to the desired programming, and reprogramming, of an electronic timer switch unit.

This is because the programmed control of timer switch units, while preferably user-friendly, cannot be generally be so extremely sophisticated that the cost of the user-friendly programmable interface vastly exceeds the cost of the rest of the timer switch. This cost problem would, however, be mitigated to some extent in a system that provided a number of different timer modules, of varying programmable sophistication and functionality, which could be selectively used in timer switch systems as required.

Additionally differentiating the programmable control of an electronic timer switch from the prior art control of a VCR or television is a requirement that the switch, in response to a manually initiated signal be able to override a preprogrammed condition without the necessity of changing the installed program. Finally, electronic timer switches may be required to control events based on diurnal occurrences such as sunrise and sunset. This variable, diurnal, occurrence of timed events is not used for control of timers that are programmable only to capture television signals at set times for set durations on set days. When prior art electronic timer switches have performed switching based on periods of light and darkness, this switching has normally been controlled by photo cells or other sensors of the light. These photo cells generated control signals that were additive with other, timed, control signals originating within the timer switch unit.

SUMMARY OF THE INVENTION

In accordance with the present invention, a modular switch system is provided. The switch system includes a modular and programmable control unit. The control unit includes a manually operable keyboard.

The control unit includes a display with two regions. In one region user assisting messages or symbols can be displayed. In a second region, indicia indicative of operator entered information can be displayed.

The control unit also includes circuitry for generating at least one time varying control signal in response to operator entered information. A switching module couplable to the control unit can be actuated in response to the control signal.

The present invention is embodied in an electronic timer switch system, in a method of electrical switch control performable by such system, and in a programmable electronic timer component of such system that accords, amongst other things, ease of manual programming and an ability to maintain the time of diurnal events such as sunrise and sunset.

The timer switch system in accordance with the present invention has at least one event timer unit that produces an electrical signal, typically in both its normal and complemented form, at and upon the occurrence of certain timed events. This signal(s) is received at a switch module that can be of one, fixed, electrical circuit design. The switch module is, notwithstanding its fixed design, capable of variously selectively functioning as either an SPST (or 2PST, or 3PST, or 4PST), or a DPDT switch selectively dependent only upon the various associated electrical connections that are externally made to the switch. One switch module of unitary design thus suffices to selectively perform multiple switching functions as were typically performed by separate and unique switches in the prior art.

The switch module can be prepackaged in a selected one of a family, typically four in number, of modular switching modules. These individual modules variously present the particular external electrical connections that enable the switch to variously function as the SPST, DPST, or DPDT switch. In the instances of implementing a 3PST or 4PST switching function, the modules also present internal jumpers to the switch. All required external electrical connections are presented by each modular switching module, and from module to module, in a highly regular and uniform manner. By the regular external appearance of the switch modules, which can be limited to four only varieties, the electrical installer of the switch modules may gain enhanced familiarity with the sequence of electrical connections that must be made for variously selectively establishing the SPST (to 4PST), or DPDT switch functions.

Instead of one switch module implementing a variety of switch functions, a variety of different switch modules can be used.

Moreover the switch is modularly prepackaged as is the timer. The modular electronic timer is preferably implemented as a family of timers each of which exhibits differing capabilities. Particularly, one modular timer is programmable to provide on/off control to an associated modular switch for up to eight timed events for each of five days (nominally the weekdays), a separate eight timed events for two days (nominally the weekends), and a capability of skipping the events within any one to seven days (a total of 16 events).

An enhanced modular timer is programmable for up to eight on/off events uniquely upon each day of the week. A still further enhanced modular timer keeps 24-hour astronomical time and is capable of controlling an associated switch to switch a load on at local sunset and to switch the same load off at local dawn (or vice versa) without any use of a photo cell or other light sensor. An offset can be programmed into the unit is desired.

All the modular electronic timers exhibit ease of manual programmability via clearly marked and logically arrayed control panels with pushbutton switches, the responses to which are exhibited in a display area. Each control panel particularly permits that the timer operation may be sucessively sequenced through a number of programming and operation modes. Within each of the modes certain switches that are elsewise used for other data inputs in other modes are multiplexed for data inputs appropriate to the selected mode. Each user control panel further has an on/off override switch that allows the current, and clearly displayed, on/off electrical control state of the timer to be toggled.

Multiple combinations of the typically four modular switches with the typically three modular electronic timers create a modular electronic timer switch system having great flexibility that is tailorable and suitable for diverse applications. The module-based timer switch system typically fits existing enclosures for timer switches, and may be retrofitted to existing timer switch systems.

BRIEF DESCRIPTION OF THE DRAWINGS

These and other attributes and aspects of the present invention will become increasingly clear on reference to the drawings and accompanying specification wherein.

DESCRIPTION OF THE PREFERRED EMBODIMENT

The present invention is embodied in a timer switch system having modular timer and switch components, and within each of such timer and switch components. Within the switch component, the present invention accords that a single, unitary, electrical circuit should variously selectively function as a SPST, a DPST, or a DPDT switch selectively dependent only upon the various electrical connections that are made to the switch. Moreover, the same electrical switch circuit will also further function as a 3PST or 4PST switch selectively dependent only upon the electrical connections and, additionally, an opened control signal jumper within the switch. Despite the standard electrical circuit design of the switch, it is typically prepackaged as a modular switch of four slightly different physical designs as individually besuit the use of the common switch circuit in its SPST to 4PST, or DPDT applications. Four prepackagings of the common switch circuit are diagrammatically shown as switch modules S1-S4 in FIG. 1.

Switch S1 is electrically connectable as a SPST switch; switch S2 is electrically connectable as a DPST switch; switch S3 is electrically connectable as a DPDT switch; and switch S4 is electrically connectable as a 4PST switch (or a 2PST, or a 3PST switch). Electrically and mechanically interconnecting to each of the switches S1-S4 is a selected one of a plurality of modular timers. There are typically three different modular timers illustrated as timers T1-T3 in FIG. 1. Each of the timers T1-T3 functions as a 24-hour timer that is programmable to provide an electrical ON/OFF signal at multiple event times on each of the weekdays and weekends, with an additional ability to skip provisioning of the ON/OFF signal on certain days.

Figure 2:
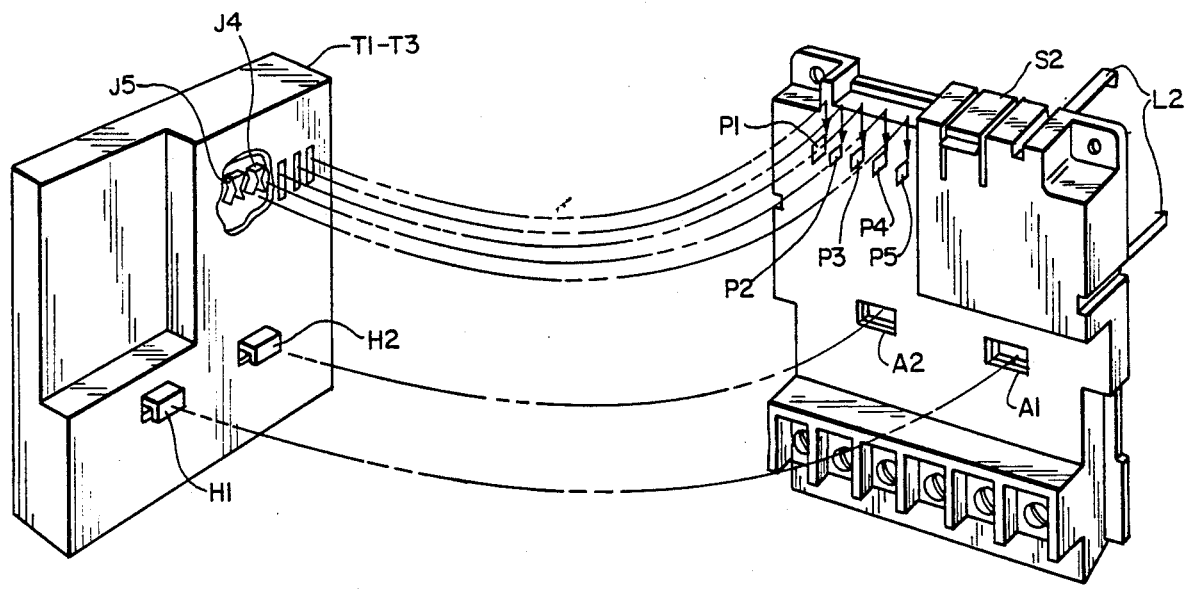
FIG. 2 is a pictorial representation showing the manner of mechanical and electrical connection between a typical modular timer and a modular switch within the timer switch system in accordance with the present invention.

Each of the timers T1-T3 is electrically and physically interconnected to a corresponding one of the switches S1-S4 in the manner illustrated in FIG. 2. Typically two snap-lock hook tabs H1, H2 that are upon each timer module T1-T3 mate with corresponding complementary apertures A1, A2 in a switch module, illustrated by example to be switch module type S2 in FIG. 2, in order to retain male plugs P1-P5, typically located on the switch module, in secure electrical contact with complementary jacks J1-J5, typically located on the timer T1-T3. Each module may be physically disconnected without special tools from the other module for repair or replacement.

Three electrical paths, or contacts, of the plugged electrical connection are used for providing D.C. power and an A.C. power signal from each switch S1-S4 to its associated timer T1-T3. Two of the electrical paths, or contacts, are used for the communication, in both normal and complemented form, of the ON/OFF control signal from the timer T1-T3 to its associated switch S1-S4.

Returning to FIG. 1, each of the switches S1-S4 and the timers T1-T3 is typically housed in a molded plastic case, typically of black or dark gray color. A control panel area CP1-CP3 is respectively presented on each of the timers T1-T3. Indicia within the control panel area CP1-CP3 are typically second surface silkscreen printed. Each control panel CP1-CP2 possesses an alphanumeric display area, typically implemented as a Liquid Crystal (LCD) display, that is easily read with use of a flashlight even at low ambient light conditions.

Each control panel CP1-CP3 also contains an associated array of pushbutton switches PB1-PB3. The pushbutton switches are the sole means by which both data and control is manually entered into the timers T1-T3. None of the timers T1-T3 uses any slide or toggle switches in its associated control panel area CP1-CP3, nor anywhere else. The arrays of pushbutton switches PB1-PB3 are preferably finger-sized, and are preferably covered with an elastomeric membrane for protection in hostile environments. The pushbutton switches preferably provide a tactile feedback to actuation which, along with the visual feedback occurring within the display D1-D3 that is induced by switch actuation, provides a user interface that is effective and efficient for both manual data entry and timer control. A timer control status and event data display is multiplexed under pushbutton switch control to a display area presenting information. The logical, concise, and ergometric construction of control panels CP1 CP3 of timers T1-T3 will be further discussed in conjunction with FIGS. 4 and 5.

Although timers T1–T3 normally operate under A.C. power that is received through their plug connection to a respective one of the switches S1–S4, each timer is provided with a battery, typically a nine-volt battery, back-up power source. The back-up power source permits preservation of the timer's programmed contents, or memory, during periods of power outage. As may be typically observed for battery B3 within timer unit T3 shown in FIG. 1, the battery is readily manually replaced from the front of the installed timer switch system. Replacement may be accomplished while the unit is energized without hazard to the system's ongoing operation or to the maintainer.

The battery backup enables the timer module, such as T1, to be removed from the respective switch module, such as S1 for programming. Programming can thus be carried out at a location remote from the installed switch module. The timer module and entered program can then be returned to and plugged into the switch module.

Figure 3:
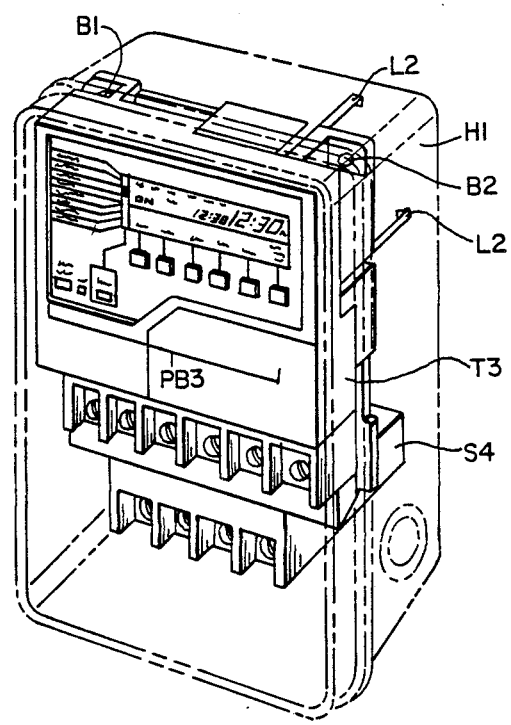
FIG. 3 is a pictorial representation showing an assembled timer switch system in accordance with the present invention in location within an external housing that is shown in phantom line.

A sample housing, or enclosure, H1, is illustrated in the exploded view of FIG. 1, and again in phantom line with a timer switch system enclosed therein within FIG. 3. The housing H1 is a standard National Electrical Manufacturers Association (NEMA) type for either indoor or indoor/outdoor use. The illustrated housing is the NEMA indoor/outdoor type. The housing H1 presents standard internal features such as hooking latches, or locks, L1 which engage and retain complementary surfaces on the modules which are plugged within the housing, particularly one of the switches S1–S4.

Each of the switch modules S1–S4 carries L2 which carry a supporting arms printed circuit board. The switch module circuitry is implemented on that printed circuit board.

Bolt holes B1, B2 on each of the switches S1–S4 may be optionally fitted with bolts (not shown) to threadingly engage complementary threaded holes within the housing H1 to further securely mechanically retain one of the switches S1–S4, and the selected timer T1–T3 that is plugged thereto. Electrical connection to a switch S1–S4 positioned in the housing H1 is made through wire conduit W1 (shown in FIG. 1), which routes electrical signals, typically A.C. power, to and from the timer switch system. The terminal ends of the wires (not shown) carried in conduit W1 make electrical connection to the timer switch system at the terminal blocks TB1–TB4 of a respective switch S1–S4.

Figure 4A:
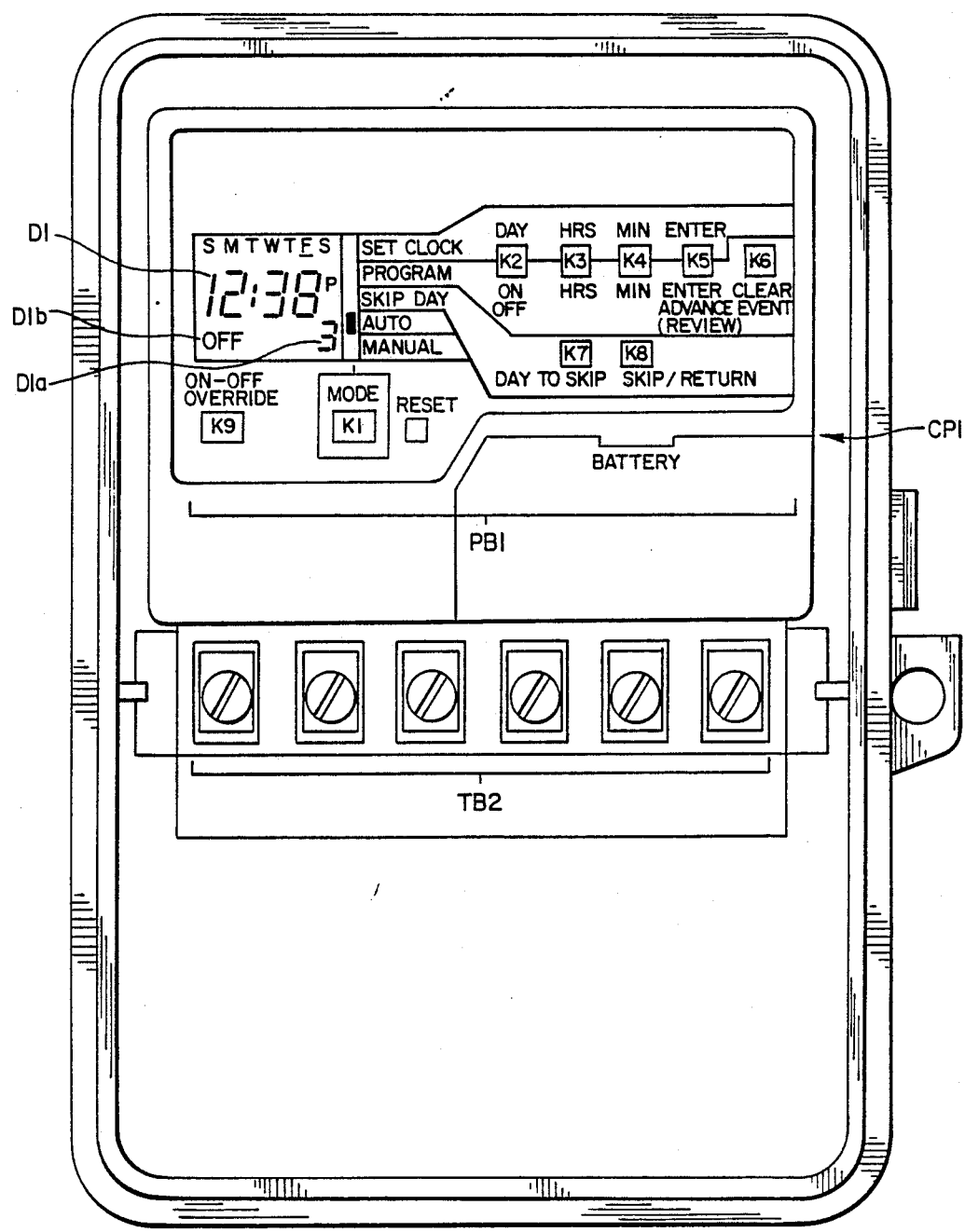
FIG. 4, consisting of FIG. 4a and FIGS. 4b and 4c, show front pictorial views of the operator control panels of two different modular timers within the timer switch system in accordance with the present invention.

A control panel CP1 of timer T1 in operative position upon a switch, by example switch S2, is shown in frontal view in FIG. 4a. Similarly, the control panel CP2 associated with the timer T2 is shown in frontal view in FIG. 4b. The control panel CP3 is illustrated in FIG. 4c combined with switch module S2.

Amongst the pushbutton switches PB1–PB3 of the control panels CP1–CP3, a MODE pushbutton switch K1 is used to select among alternative modes of operation at the control panel. Each depression of the MODE pushbutton switch K1 causes the indicator I within each of the displays D1–D3 to cyclically advance through the various modes that are indicated by indicia adjacent to the indicator I of its various positions.

The programmable function of timer T1, for which the control panel CP1 is shown in FIG. 4a, is the simplest. Correspondingly, the control panel CP1 is also simpler than the control panels CP2, CP3, respectively for timers T2, T3.

The timer T1 may be programmed with up to eight timed events in common for each of five consecutive days (the weekdays) and a separate eight common events for each of two consecutive days (the weekends). The timer T1 is capable of skipping any one to seven days of the week. When a day is skipped, then the toggling of the ON/OFF electrical output signal responsively to that day's timed events will not transpire.

The control panel CP1 of timer T1 shown in FIG. 4a is accordingly used to program timer T1. When the SET CLOCK mode is chosen by MODE switch K1, then the pushbutton switches DAY K2, HRS K3, MIN K4, and ENTER K5 are active to respectively advance the day, hour, and minute of the current day and time-of-day, and enter that data into memory. During entrance of information, the display area D1 will reflect the selected day by advancement of an underline appearing under symbols S M T W T F S, plus a conventional representation of hours and minutes including a P (illustrated) or an A (not shown) respectively indicating P.M. or A.M. Depression of the ENTER pushbutton switch K5 sets the master clock of the programmable electronic timer T1 to the selected time.

Continuing in FIG. 4a, an alternative selection of the PROGRAM mode by MODE pushbutton switch K1 renders pushbutton switch K2 active to specify an ON-OFF output control signal. Pushbutton switch K3 is active to specify the hour of initiation of the event, pushbutton switch K4 active to specify the minute of initiation of the event, pushbutton switch K5 active to ENTER the time and the event into memory. The same key can be used to ADVANCE (REVIEW) other, previously entered events. Pushbutton switch K6 is active to CLEAR EVENT. Notably, some of these pushbutton switches, mainly K2 through K5, are the same pushbutton switches which were previously used in the SET CLOCK mode. Thus, the signal outputs resultant from actuation of certain ones of the pushbutton switches PB1 are, at different times, multiplexed to provide different data inputs to the timer T1.

The operation of ON/OFF pushbutton switch K2 enables a single timed event to be used to control when the programmable electronic timer T1 should provide an ON, logically true, control signal to the associated modular switch S1–S4, or should, alternatively, provide an OFF, logically false, control signal to the same switch. Events may be programmed at any hour via pushbutton switch K3 and at any minute of that hour via pushbutton switch K4. Successive events may be entered, or reviewed, by actuation of ENTER ADVANCE (REVIEW) pushbutton switch K5. Previously entered events may be cleared by actuation of CLEAR EVENT pushbutton switch K6.

Continuing in FIG. 4a, further successive actuations of MODE pushbutton switch K1 allow selection of mode SKIP DAY. Within this mode, actuation of DAY TO SKIP pushbutton K7 allows sequencing through successive days as are revealed in the S M T W T F S section of display D1. Any depression of the SKIP/RETURN switch K8 will, if a skip day or days control is not in process, initiate such a skip day. The K7 key can then be used to advance the "day" indicium to the next day. Successive days, up to seven total, can be skipped.

Entrance of the AUTO mode by successive actuations of MODE pushbutton switch K1 places the timer T1 in its normal, automatic, operational mode. In this mode pre-programmed timed sequence events are compared to the current day, 24-hour, and minute time which is maintained by the timer T1. When a match between any current time and a previously programmed timed-sequence event is obtained, then the event number D1a is displayed at the lower right of display area D1 and the pre-programmed ON/OFF signal of appropriate condition is both supplied to the associated switch S1–S4 and displayed at the lower left D1b of display area D1. This event number and the current ON/OFF status will be displayed until the next programmed event, or until any manual actuation of ON-OFF OVERRIDE pushbutton switch K9.

Finally in the operation of timer T1 shown in FIG. 4a, successive actuations of the MODE pushbutton switch K1 to select the MANUAL operational mode produce a timer operation wherein current time is displayed but all programmed events are ignored. The user may, notwithstanding the timer's ability to toggle the ON/OFF state of the control signal responsively to pre-programmed timed sequence events, change the condition of such signal by depression of the ON/OFF OVERRIDE pushbutton switch K9.

Figure 4B:
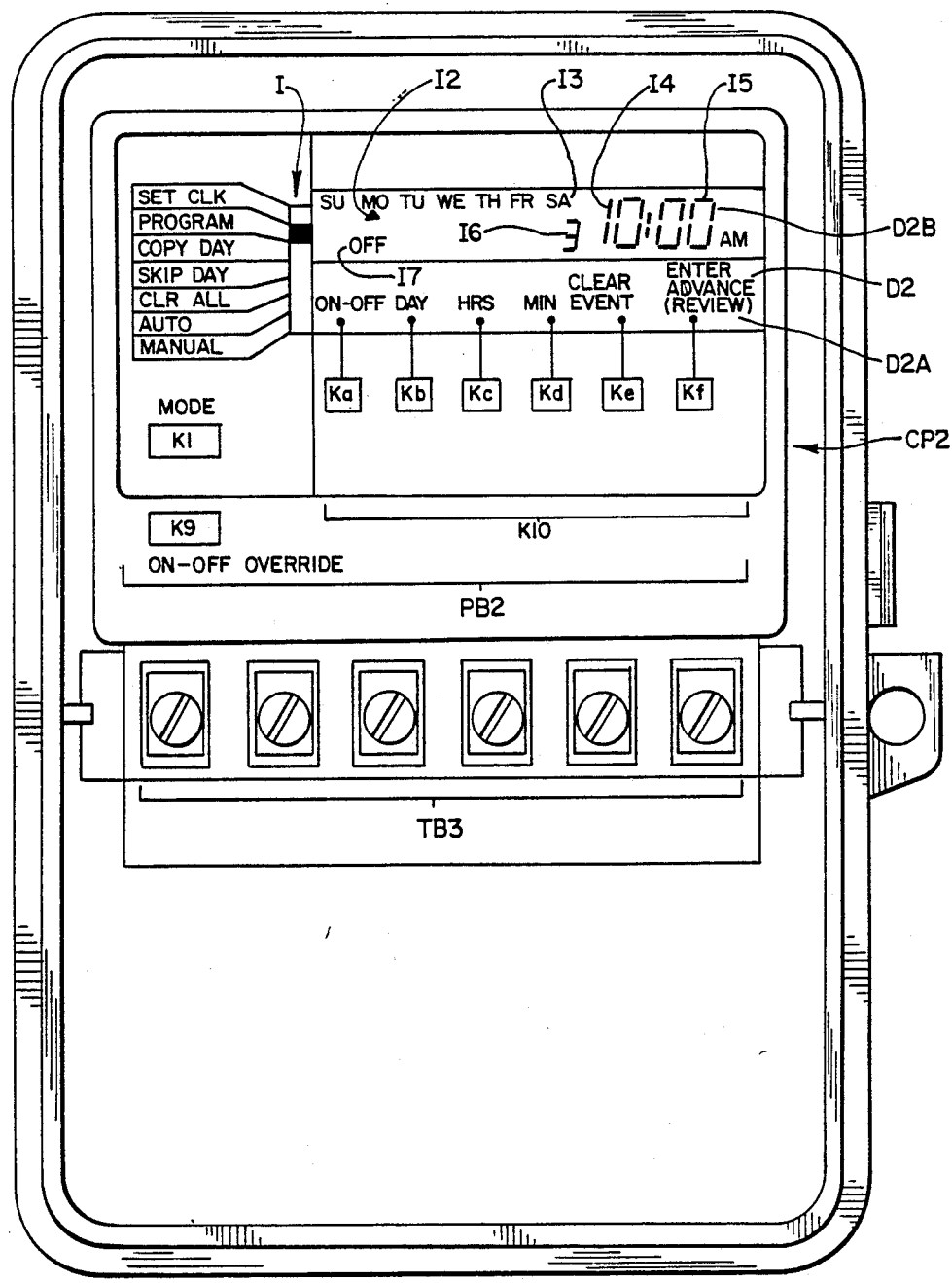
Figure 4C:
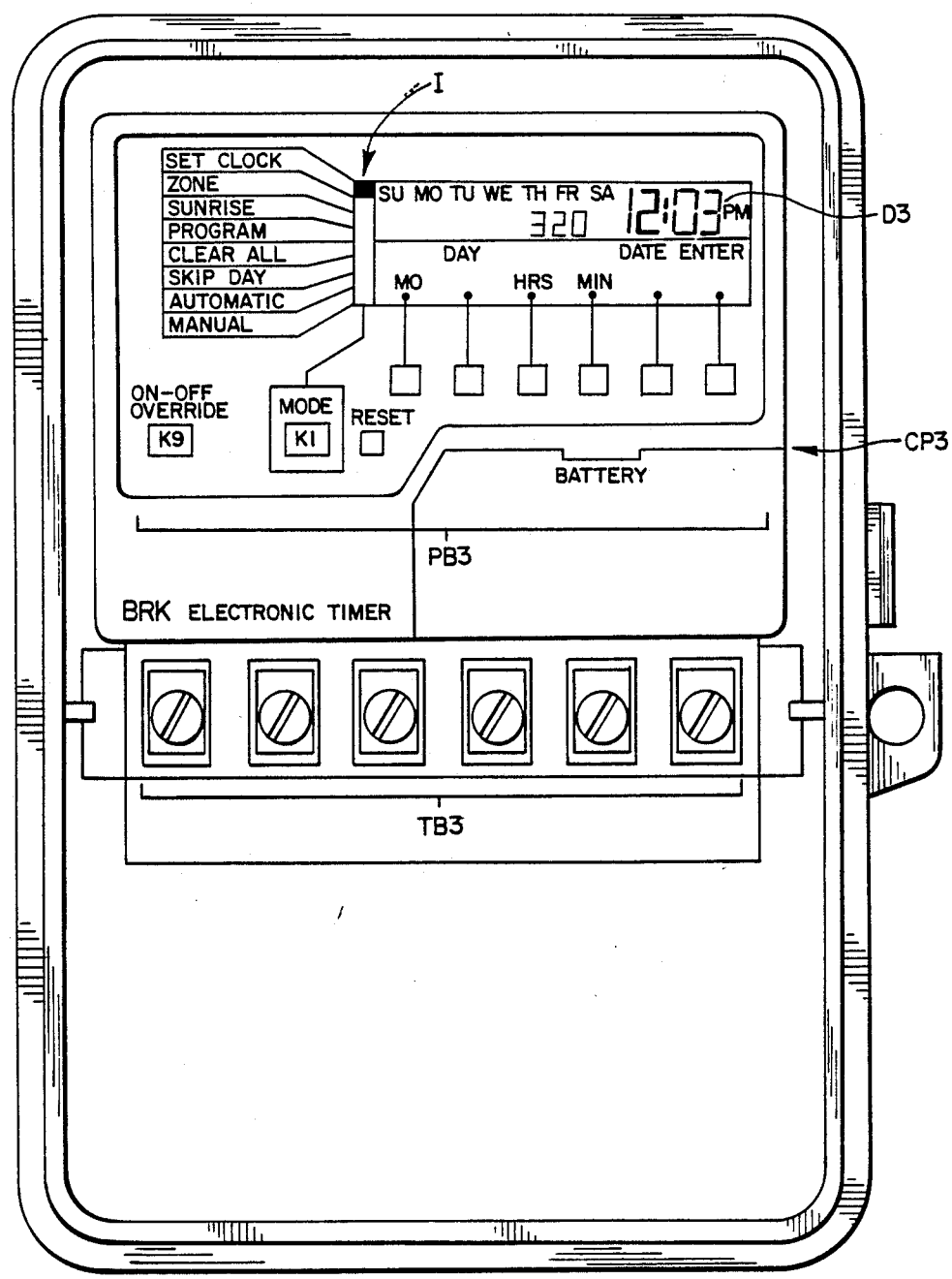
Figure 5:
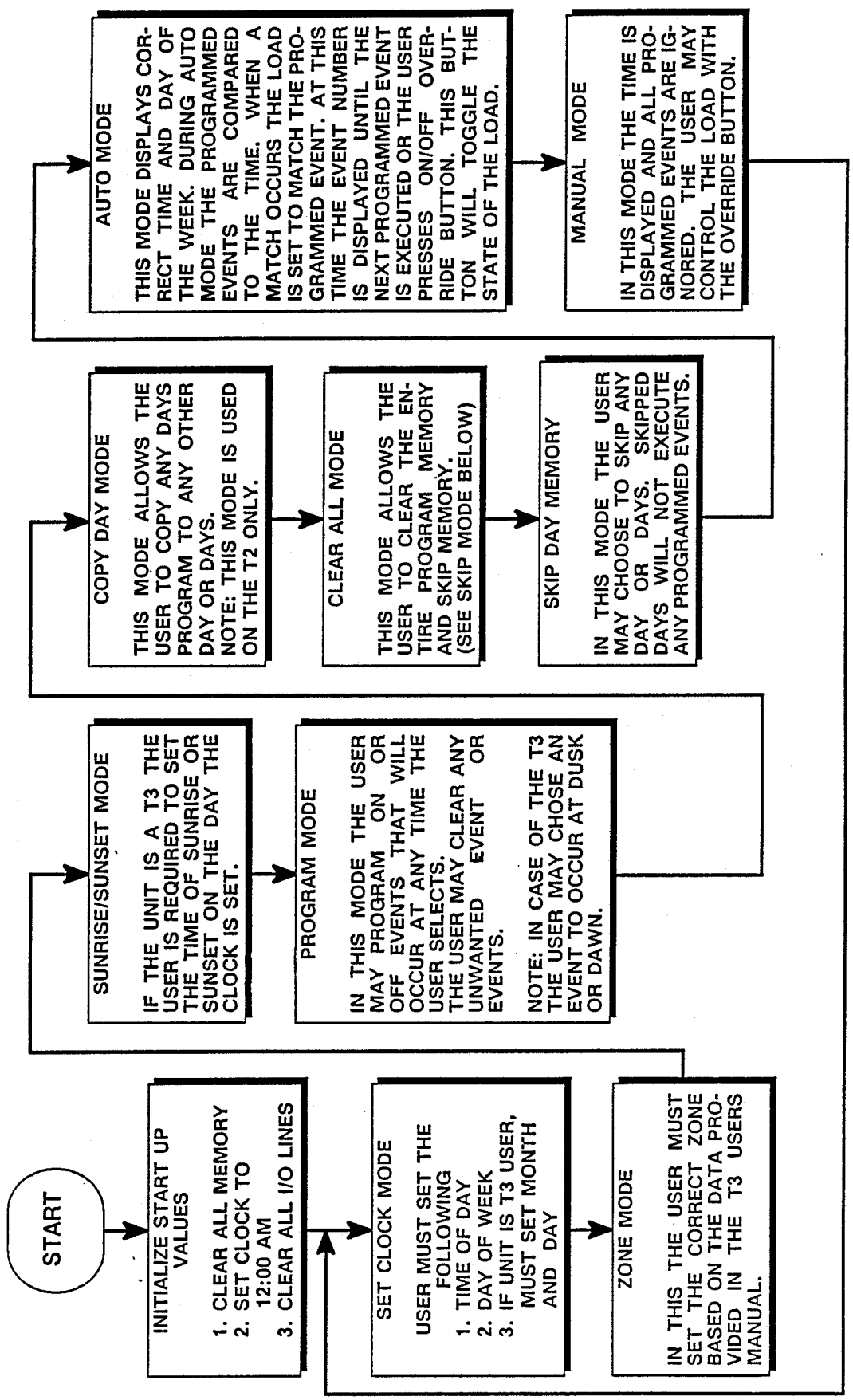
FIG. 5, consisting of FIG. 5a and FIG. 5b, shows a top level, functional, program and procedure diagram showing the various modes that may be entered, and the data that is associated with such modes, at the operator entry panel of the timers of the timer switch system in accordance with the present invention.

The control panel CP2 of the timer T2, as illustrated in FIG. 4b, has a substantially different appearance and structure from the control panel CP1. The display D2 is substantially more complex and provides immediate feedback to the user as a data entry sequence is being carried out.

The control CP2 includes a moveable indicium I responsive to depressions of the mode switch K1. The indicium I can be used to define one of several modes. The available modes include a set clock mode, a program mode, copy a program from day to another, skip a day, clear off previously entered events, automatic operation and the manual mode. When a mode is selected using the key K1, the display D2 displays appropriate feedback information and labels for a plurality of keys K10. By displaying functional labels for the keys K10 on the display D2, the keys can be refined to have different functions in different modes and to have different functions at different times in a given mode.

The display D2 is divided into two parts. A first, or lower part, D2A, can be used to display operator assisting prompt messages. These messages or symbols can be used to specify a function temporarily assigned to a selected key. The functions can change during the operator interaction.

A second, or upper, part D2B is used to display feedback information illustrating how the depressions of the keys are affecting the information contained within the timer.

FIG. 4b illustrates the display D2 when the mode indicium I is set to the program mode. In this mode, key $K_B$ is defined by the first part D2A of display D2 to be usable to set the ON/OFF condition of an event. The key $K_B$ is defined by the display D2 to be a day setting key by which an underscore indicium I2 can be moved beneath a plurality of day defining indicia I3.

The key $K_C$ is defined by the display D2 to correspond to the hour of initiation of an event. The display D2 also includes an hour indicium I4. The key $K_D$ is defined by the display D2 to be a minute definer of an event and is used in combination with a minute display I5.

The key $K_E$ is defined by the display D2 to be a clear event key for the purpose of removing an event from the preprogrammed sequence. Finally, the key $K_F$ is defined by the display D2 to have an enter or advance function. Newly defined events can be entered by depressing the key $K_F$. Alternately, the key $K_F$ can be used to step through a plurality of prestored event sequences. The display D2 also provides an indicium of I6 identifying the current event either being programmed or examined.

To enter an event, the key $K_A$ can be used to define whether the event is an on or an off signal. The status of the current event appears as an indicium I7 on the display D2. Then the day of the event can be defined using the key $K_B$. The hour and minute of the initiation of the event can be defined by keys $K_C$ and $K_D$. Finally, the event can be entered into the program memory of the display D2 using the enter key $K_F$.

By means of the display D2 and the plurality of keys $K_{10}$, 56 different events can be entered into the timer T2. This corresponds to eight different events for each of seven days in a week.

To improve ease of programming, a copy day mode is provided which can be selected by use of the mode switch K1. When the copy day mode is selected, a program associate with the first day, which has been previously entered, can be copied to a second selected day with just a signal key stroke. Further, a skip day mode is provided which enables the operator to skip a day so that no events are carried out on a selected day. The clear all mode is used to reset the timer T2. The auto mode is used when the timer T2 is executing a prestored program. Finally, the manual mode is used when the operator wishes to control the switch module S to manually.

In timer T3, FIG. 4c certain modes and functions are implemented that are not enabled in timers T1, T2. Timer T3 includes a 24-hour astronomical timer unit. It is capable of toggling the ON/OFF control signal, normally to ON, at local astronomical dusk and to the opposite state, normally OFF, at local astronomical dawn without any use of a photo cell. The timer T3 consequently maintains not only astronomical day, hour, and minute time, but also computes local, seasonally variable, diurnal occurrences in consideration of (i) the month of the year, (ii) the day of the month, (iii) the hour and minute of the day, and (iv) the latitude, or zone, upon the earth's surface wherein the timer T3 is located.

Referring to FIG. 4c, when the ZONE mode is selected by successive actuations of MODE pushbutton switch K1, the user is directed by an accompanying user's instruction manual to insert encoded information selecting a particular zone of latitude within which the timer T3 is located. Additionally, in SUNRISE mode the user is instructed to set, in successive entries, the local time of sunrise or the local time of sunset on the particular month and day to which the clock is currently set (or running). The electronic timer T3 uses a standard algorithm, as is commonly contained within an ephemeris, to calculate the times of local sunrise and sunset based on the time of year and the geographical position of timer T3.

With the timer T3, 8 events/day can be entered for an interval of 5 days. In addition, 8 more events can be entered for the remaining 2 days of the week. Timer T3 can thus store 16 events.

The sequential mode-selected program control of the timers T1–T3 that is enabled through their respective control panels CP1–CP3 is shown in functional flow chart form in FIG. 5a, 5b. It will be observed from notes appearing within various blocks of flowchart, which blocks reflect the various modes, that not all timers T1-T3 implement all modes. Additionally, certain modes, such as the SET CLOCK mode, call for the insertion of slightly differing data depending upon which timer T1-T3 is enabled. The implementation of the differing modes within the different timers T1-T3 is in accordance with the following table:

|    | Set Clock | Zone | Program | Copy | Clear All | Skip Day | Auto | Manual |
|----|-----------|------|---------|------|-----------|----------|------|--------|
| T1 | X         |      | X       |      | X         | X        | X    | X      |
| T2 | X         |      | X       | X    | X         | X        | X    | X      |
| T3 | X         | X    | X       |      | X         | X        | X    | X      |

An "X" within an intersection of the rows and the columns of the table indicates that the mode feature is implemented within the corresponding timer T1-T3.

Figure 6:
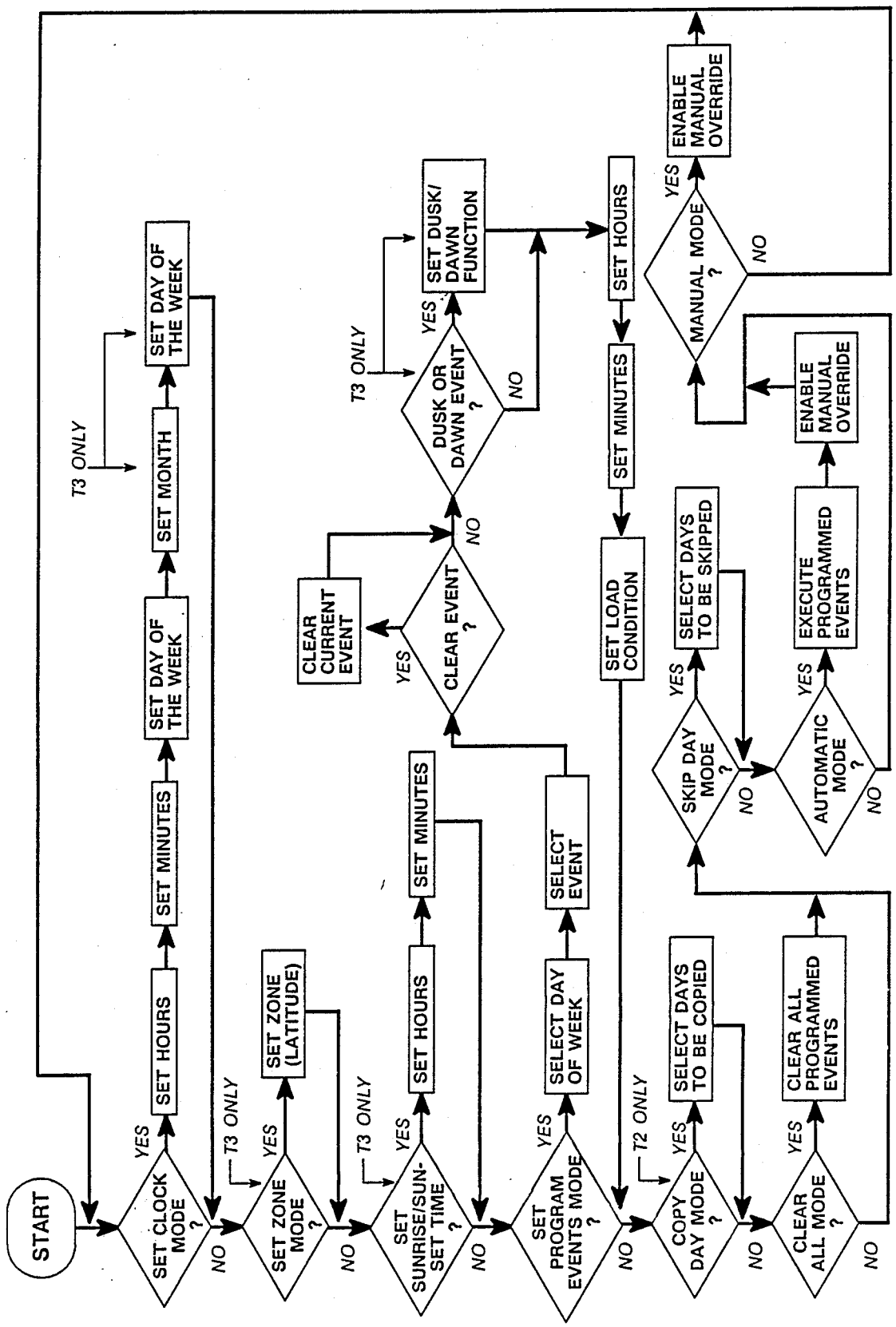
FIG. 6, consisting of FIG. 6a and FIG. 6b, is a second-level program flow chart showing the sequence of programmed processing occurring within the processor of each timer within the timer switch system in accordance with the present invention.
Figure 7:
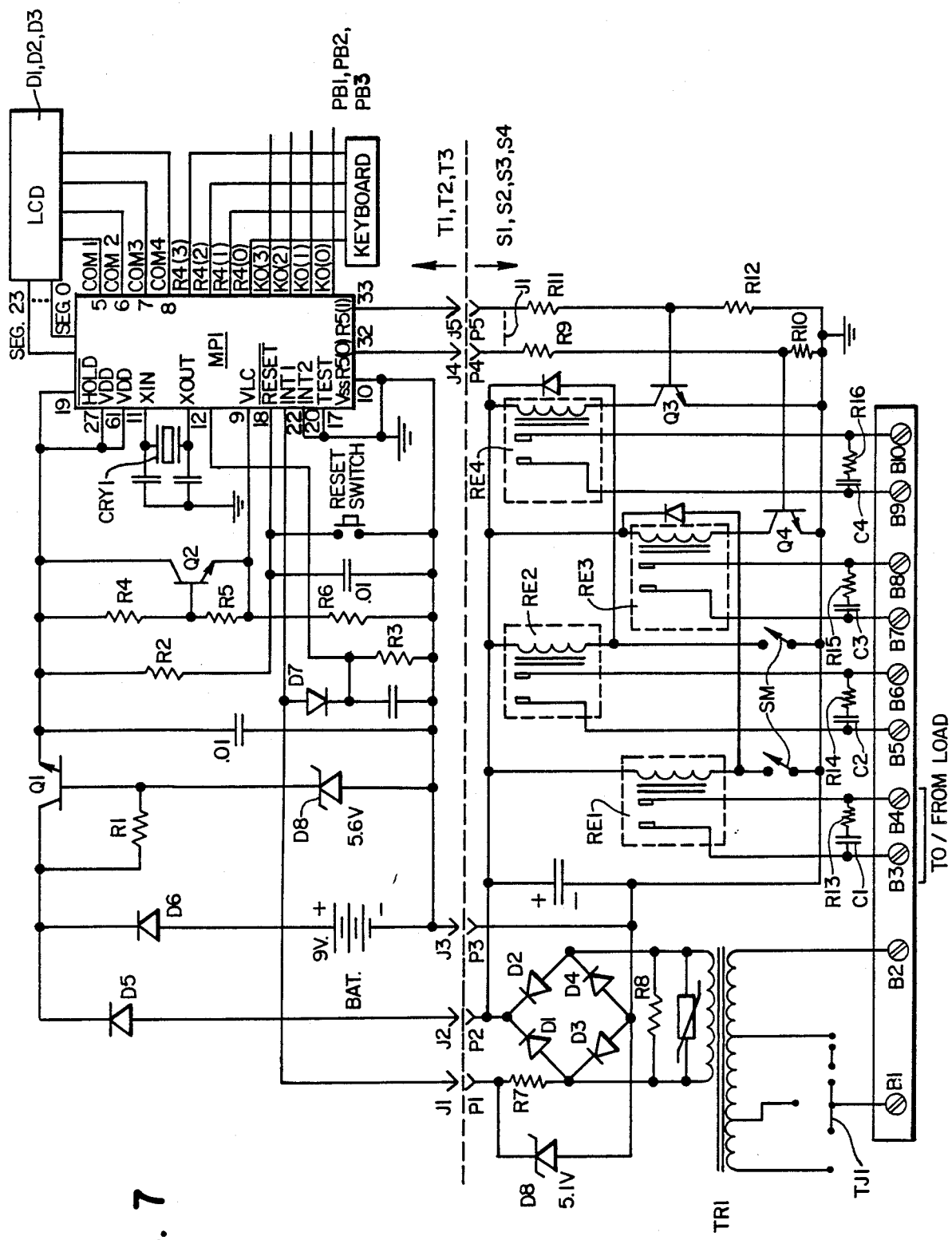
FIG. 7 is a schematic diagram of a typical timer circuit electrically connected to the universal switch circuit within the timer switch system in accordance with the present invention.

The mode-based data entry and control of timers T1-T3 is implemented via software, or firmware, that is run upon a microcomputer MP1 (shown in FIG. 7). The flow chart of the general control program that is exercised, including specific functional loops which are executed only within certain one(s) of the timers T1-T3, is shown in FIGS. 6a, 6b. The operational program that is flowcharted in FIGS. 6a, 6b implements that functional performance of timer units T1-T3 that was diagrammed within FIGS. 5a, 5b. It will be recognized by a practitioner of the programming arts that certain variations in the functional sequences of FIGS. 5a, 5b, and in the corresponding program sequences of FIGS. 6a, 6b, are possible without departing from the spirit and scope of the present invention. Particularly, the entrance into each mode need not be evaluated, and the recovery of data within any particular mode need not be ordered, precisely as is indicated. It is rather of importance only that the control panels, and the programmed timer operation, should generally use only a limited number of pushbutton switches that, as arrayed upon a clearly and functionally designed control panel, are multiplexed to perform differing data entry to and control of the timer upon different data entry sequences, or modes.

The exact nature and number of the modes variously implemented within the timers T1-T3, and the exact data entered therein each such mode, is less important than the concept that the user interface to such timers should be based on a multiplicity of interface control sequences, or modes, wherein particular data is inserted, substantially by the overlapped, multiplexed, usage of the same pushbutton switches. By this manner of construction and operation, a large number of differing types of data may be entered, at different times, into the programmed control of the electronic timer and of timer switch system of which it is a part. Moreover, the proliferation of large numbers of individual function switches is avoided because the same switches can be used, at different times, for either the same, or related, or differing data entries into the electronic timer in accordance with the individually selected mode. The result of this mode-selected, multiplexed switch, approach to data entry are those concise and economical control panels CP1-CP3 that are illustrated in FIGS. 4a, 4b. Nonetheless to the conciseness of the control panels CP1-CP3, they are readily understandable and easily operable by a user/programmer of the timer switch system.

A schematic diagram of the common circuit of each of the switches S1-S4, and also of a representative portion of the circuit common to each of the timers T1-T3 that is interconnectable to such switches, is shown in FIG. 7. That portion of the electrical circuit common to each of the timers T1-T3 appears above the dashed line, while the common electrical circuit of each of the switches S1-S4 appears below the dashed line. The modular timers T1-T3 and switches S1-S4 interconnect by the mating of plugs P1-P5 with complementary jacks J1-J5 (previously seen in FIGS. 1, 2). The common circuit of switches S1-S4 possesses ten electrical terminal connections labeled B1-B10. In accordance with the observably different prepackagings of switches S1-S4 shown in FIG. 1, and in accordance with the following explanation, not all of the terminals B1-B10 are invariably exposed and used in each prepackaged application of the common switch circuit. The common switch circuit shown in schematic diagram in FIG. 7 may be used variously as SPST switch S1, DPST switch S2, DPDT switch S3, or as 4PST switch S4. Only so many terminals as are needed to make appropriate electrical connection for the intended SPST-4PST, DPST, or DPDT usage of the common circuit are exposed by the prepackaging.

Direct current power for use in the common circuit of each of the switches S1-S4, and also within each of the timers T1-T3, is developed within the common switch circuit. Alternating current input power is received at 120 plus or minus ten percent, 208/240 plus or minus ten percent, or 270 plus or minus ten percent V.A.C. levels at 60 Hz between terminals B1, B2. The prewired connection of terminals B1, B2 to the windings of transformer TR1 determine the required input A.C. voltage level using transformer primary jumper TJ-1. Additional external terminals could have alternatively been used as opposed to predetermined internal wiring. It will, however, be understood that the tailored prepackaging of the common switch circuit to the present invention is generally directed to minimizing confusion and error of the timer switch system installer. Accordingly, it is believed to be superior to control some variable, such as the required input A.C. power level, internal to the package at the expense of producing more different, packages that must be carried in inventory. The benefit that installation effort and potential error in the selective strapping and routed connection of signals should be minimized outweighs materials costs. Alternating current in the secondary winding of transformer TR1 is rectified in the diode bridge consisting of diodes D1-D4 and is provided as an approximately +12 V.D.C. voltage level, appearing between plug jack P2 and P3, to a connected one of timers T1-T3. A reference A.C. voltage waveform, current limited by resistance R7 of value approximately 2.2K ohms and clamped to approximately 5.6 volts by zener diode D8, is supplied at plug jack P1.

Moving in the schematic diagram of FIG. 7 to the common circuit portion of timers T1-T3, the 0-volt D.C. ground supplied at jack J3 is received at microprocessor chip MP1 as voltage $V^{SS}$. The approximate +12 V.D.C. voltage is passed through forward-biased diode D5, and through transistor Q1 that is biased by resistor R1 and zener diode D8 of breakdown voltage 5.6 volts, to positive voltage input $V_{DD}$ of microprocessor MP1. If D.C. voltage supply is not available from a connected switch S1 S4, then the timer T1-T3 preferably contains a 9-volt battery BAT. This battery BAT supplies current through diode D6 between the identical $V_{DD}$ and $V_{SS}$ voltage ports of microprocessor MP1. It will be understood by a practitioner of electronic design that the power supply producing D.C. power from input A.C. power could have alternatively been within each of the timer units T1-T3 instead of being within the switches S1-S4 or, alternatively, external to any of the timers T1-T3 and switches S1-S4. Similarly, the battery could have been within the switch S1-S4 as opposed to being within the timers T1-T3, or could have been external to both timer and switch. The precise provisioning of power, and of backup power, to the circuits of the present invention is thusly susceptible to various embodiments. One pertinent concept is simply that the necessary connection to external, A.C., power should be efficient and effective while a battery-provided backup power should be supplied to the clock function (only).

Continuing with discussion of the circuit of timers T1 T3 shown in schematic diagram in FIG. 7, the microcomputer MP1, typically type Toshiba TMP47C220AF is used in module T1; Toshiba type TMP47C420AF is used in the modules T2 and T3 receives both a reference signal from crystal CRY1 between its ports $X_{IN}$ and $X_{OUT}$. The normal crystal frequency is 4.2 MHz, and the microprocessor MP1 divides this frequency in counters as required to keep the time of day. The microprocessor MP1 receives binary encoded inputs on four lines of its R4 bus from pushbutton switches PB1-PB3 (dependent upon the implementation of timer T1-T3). Likewise, the microprocessor MP1 provides output signals SEG0 through SEG23, and also COM1-COM4, to alphanumeric DISPLAY D1-D3. The DISPLAY D1-D3 is typically implemented with LCD, and the programming of microcomputer MP1 is capable of displaying substantially generalized alphanumeric messages within this DISPLAY area. The microcomputer MP1 is also connected to self-contained memory (not shown) which contains an operational program that is particularlized to the particular embodiment of the timer T1-T3 that is being implemented. The operational program flowcharted in FIGS. 6a, 6b, is run by the microcomputer MP1.

The single ON/OFF output signal of microprocessor MP1 is produced in respective normal and complemented form at respective ports R5(1) and R5(0). A delay on the order of 60M sec is provided before a control signal becomes asserted to insure that there is always a break-before make function in the unit. This ON/OFF output signal is toggled to the preprogrammed state when the time clock kept by microporcessor MP1 matches the preprogrammed, timed-sequence, events that have been entered into the event and skip memory stores (internal to computer MP1, and not shown) of microprocessor MP1. It is important to understand that the micro MP1 is producing, in accordance with the preprogrammed timed-sequence events, but a single ON/OFF signal. This signal is, nonetheless, provided upon two signal lines at jacks J4 and J5 in its respective inverted and normal form.

Continuing in the schematic diagram of FIG. 7 with the common circuit of switches S1-S4, the inverted, and normal, forms of the ON/OFF signal received from microprocessor MP1 at plugs P4, P5 are respectively passed through volbage dividers R9, R10 and R11, R12. Each of resistors R9 and R11 is typically of value 220K ohms while each of the resistors R10 and R12 are typically of value 100K ohms. This means that a true, ON, logic high signal at port R5(1) of microprocessor MP1 produces a plus 0.6 V.D.C. level at the base of transistor Q3 and a 0 V.D.C. level at the base of transistor Q4. Conversely, a false, OFF, logic low signal at port R5(1) of microprocessor MP1 produces a 0 V.D.C. signal at the base of transistor Q3 and a 0.6 V.D.C. signal level at the base of transistor Q4. A true, ON, condition of the ON/OFF signal from microprocessor MP1 thus causes NPN transistor Q3 to conduct, allowing current to flow in parallel through the coil of relays RE2 and RE4. Meanwhile the same ON condition of the ON/OFF signal causes that NPN transistor Q4 is biased into non-conduction, with the result that no current flows within the coils of relays RE1 and RE3 and that the corresponding relay contact should remain in the normally open position. The reverse, OFF, condition of the ON/OFF signal as developed at microprocessor MP1 obviously has the reverse effect of establishing continuity of the signal paths proceeding through the coils of relays RE1 and RE3 while opening the signal paths proceeding through the coils of relays RE2 and RE4.

Signal paths switched by the relays RE1, RE2, RE3, and RE4 are respectively made through terminals B3 and B4, B5 and B6, B7 and B8, and B9, B10. Small series capacitances and resistances C1 and R13, C2 and R14, C3 and R15, and C4 and R16 respectively appear across the signal paths for contact arcing associated with the inductive loads.

In accordance with the present invention, the single switch circuit shown in schematic diagram below the dashed line in FIG. 7 may be variously selectively used, dependent only upon the electrical connections that are made to terminals B1-B10, as a switch S1 implementing the SPST switching function, as a switch S2 implementing the DPST switch function, or as a switch S3 implementing the DPDT switch function. There is no particular prepackaging of the general switch circuit shown in schematic diagram in FIG. 7 for implementation of the DPST switch function (as switch S1 is a prepackaging for implementation of the SPST switch function and as switch S4 is a prepackaging for implementation of the 4PST switch function). However, as will be discussed in conjunction with FIG. 8a, the implementation of the DPST switch function is again possible by electrical connections that are made at terminals B1-B10.

Finally, the single switch circuit shown in schematic diagram below the dashed line in FIG. 7 may also implement the 3PST and 4PST switch function. However, in implementation of these functions, the 4PST of which is prepackaged as switch S4 shown in FIG. 1, certain further selective electrical connections to the standard switch circuit of the present invention must be made in addition to those selected electrical connections occurring at terminals B1-B10. These selective electrical connections are represented in the schematic diagram of FIG. 7 by a dashed line indicating a selective break in circuit continuity below plug P4 and by another dashed line indicating a selective electrical jumper J1 between plug P5 and resistor R9. Essentially, this simple open circuit and internal jumper, readily accomplished in, for example, the prepackaged switch S4 shown in FIG. 1, causes one signal line of the ON/OFF control signal originating at microprocessor MP1 to control all relays RE1-RE4 at the same time. This signal is illustrated, by example, in FIG. 7 to be the normal version of the ON/OFF signal that originates at port R5(0) of microporcessor MP1. It could have, alternatively, been the complemented version of the ON/OFF control signal that originates at port R5(1) of microprocessor MP1. In such case, the break in signal transmission between microprocessor MP1 and the standard switch circuib in accordance with the present invention would have been alternatively accomplished at plug P5, with the signal path proceeding through plug P4 jumped to feed resistors R9 and R11 in parallel. The signal could also be inverted on the switch module if desired.

Figure 8A:
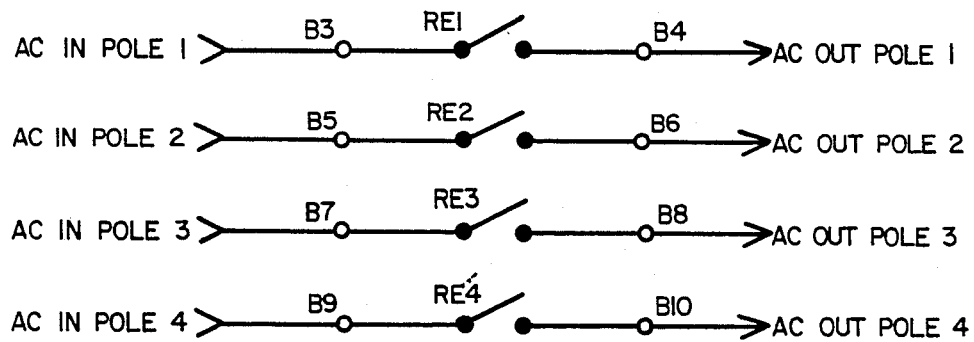
FIG. 8, consisting of FIG. 8a through FIG. 8c, is a diagrammatic representation respectively showing the electrical connections to the switch circuit, previously shown in FIG. 7, for respectively connecting such switch circuit, and the timer switch system of which it is a part, as a SPST (to 4PST), a DPDT, or DPST switch.
Figure 8B:
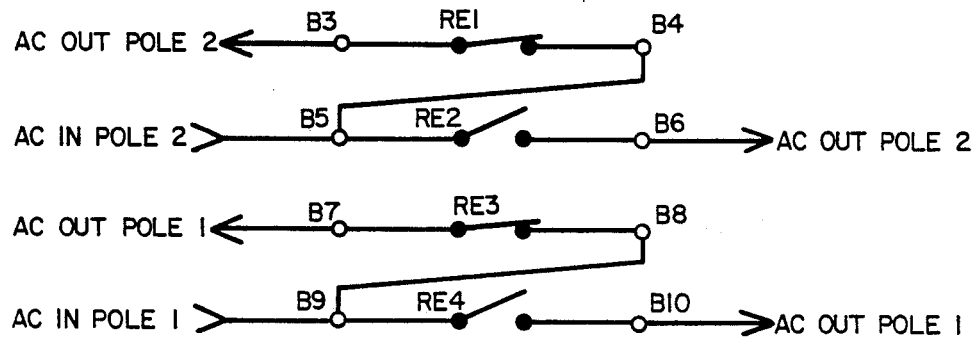
Figure 8C:
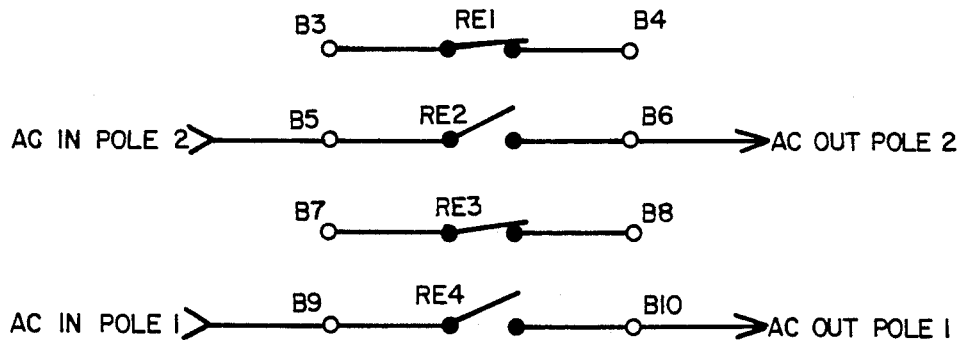

The manner of external electrical connections to the standard switch circuit of the present invention in order to variously implement the SPST through 4PST, DPDT, and DPST switch functions are respectively shown in FIGS. 8a, 8b, and 8c. In all uses of the standard circuit, the input alternating current power is received between terminals B1 and B2 (reference FIG. 7). As previously explained, this power may be, by preselected internal wiring to the primary of transformer TR1, at the 120 V.A.C., 208–240 V.A.C., or 277 V.A.C. voltage levels.

The external electrical connections to terminals B3–B10 in implementation of the SPST–4PST switch function are diagrammed in FIG. 8a. A single electrical signal, considered for example to be an alternating current input electrical signal labeled as "AC IN POLE X" may obviously be switched by each of relays RE1, RE2, RE3, and RE4 when received between respective terminals B3 and B4, B5 and B6, B7 and B8, and B9, B10. For example, signal AC IN POLE 1 received at terminal T3 may be switched by relay RE1 to appear as signal AC OUT POLE 1 on terminal T4. It will be recognized by a practitioner of the electrical circuit arts that the signals switched are often alternating current power signals (as is connoted by the labeling of the signals), but such signals need not be A.C. power and can be either direct current signals or communication signals of all natures. Therefore, although the timer switch system in accordance with the present invention is most often employed to switch power (both A.C. and, less often, D.C.) to loads, it will be understood to be of general purpose for making and breaking electrical signal paths ab preprogrammed, timed sequence, events.

In use of the standard switch circuit of the present invention that is shown in schematic diagram in FIG. 7 for implementation of the DPST switch function, the two poles of the received signals are routed to either relay pair RE1, RE2, or else to relay pair RE3, RE4. This is because, as will be remembered from the discussion of FIG. 7, relays RE1 and RE3 switch together in unison while relays RE2 and RE4 also switch together in unison (and oppositely from relays RE1 and RE3).

Implementation of the 3PST, or 4PST, switch function would not be possible in the standard switch circuit of the present invention unless all relays RE1–RE4 are controlled by the timed ON/OFF control signal originating at microprocessor MP1 (shown in FIG. 7) to switch in unison. This unified control is accomplished by the combination of opening one signal line with jumper J1 and jumping another signal line at the region of plugs P4, P5 (shown in FIG. 7). When the standard switch circuit in accordance with the present invention is so wired, then signals AC IN POLE 1 to AC IN POLE 4 respectively received at odd terminals B3–B9 will be simultaneously switched to appear as signals AC OUT POLE 1 through AC OUT POLE 4 respectively appearing at even terminals B4–B10.

Remembering that the input alternating current power is always received between terminals B1 and B2, consideration of FIG. 8a will reveal that an additional two terminals, for example terminals B3 and B4, need be used in implementation of the SPST switch function. This is exactly the number of terminals within terminal board TB1 of switch S1 shown in FIG. 1. Similarly, if the 4PST switch function were to be implemented, then all terminals B11–B10, or a total of ten such terminals, would be used. This is exactly the number of terminals shown in the terminal board TB4 part of switch S4 shown in FIG. 1.

The switch module of FIG. 7 includes a manually operable switch $S_M$. The switch $S_M$ can be used to manually operate the switch module without an associated timer module. The switch $S_M$ is carried on a front surface of the switch module, see FIG. 1.

The wired connections to the common switch circuit in accordance with the present invention for implementation of the DPDT switch function are diagrammatically shown in FIG. 8b. A jumper-wired connection is made between terminals B4 and B5, and between terminals B8 and B9. If the double, two, input signal poles are respectively received as signals AC IN POLE 1 and AC IN POLE 2 on terminals B9 and B5, then these signals can be, by virtue of the opposite action of relay pairs RE1, RE3 and RE2, RE4, routed through one only of such relay pairs at any one time. In the illustration of FIG. 8b, relay pair RE1, RE3 is closed (the ON/OFF control signal is "ON"), while relay pair RE2, RE4 is open. Correspondingly, signal AC IN POLE 1 will appear as AC OUT POLE 1 on terminal B7, while signal AC IN POLE 2 will appear as signal AC OUT POLE 2 on terminal B3. In the alternative condition of the ON/OFF control signal, signal AC IN POLE 1 would appear as signal AC OUT POLE 1 on terminal B10 while signal AC IN POLE 2 would appear as signal AC OUT POLE 2 on terminal B6. Thus, the DPDT switch function is implemented.

Figure 1:
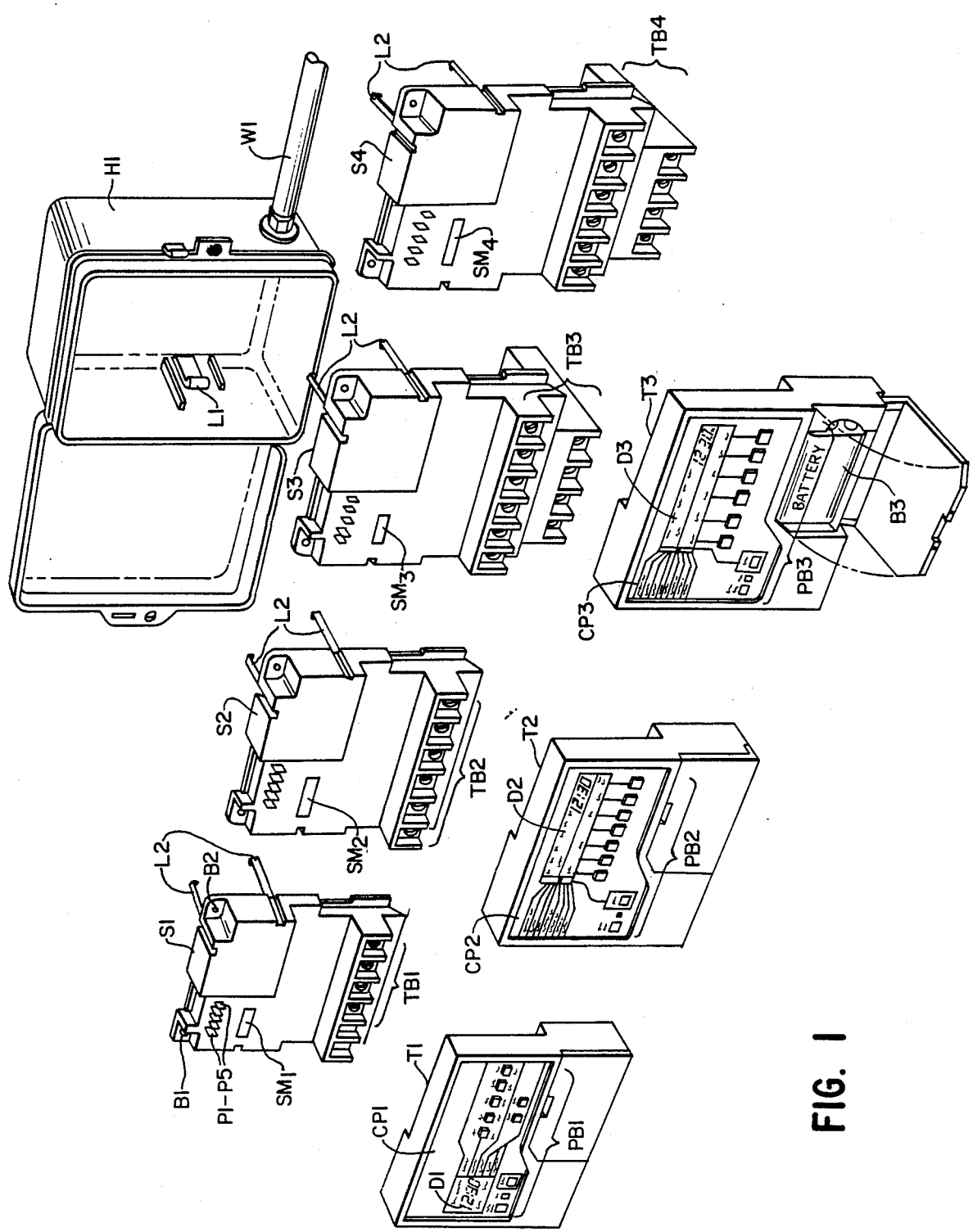
FIG. 1 is a pictorial representation showing three different modular timers, and four different modular switches, which are selectively combinable in order to produce twelve different embodiments of the timer switch system in accordance with the present invention.

Recalling that terminals B1 and B2 are used for connection of A.C. power, the connection of the standard circuit of the present invention as a DPDT switch could be done in as few as eight terminal connections if the jumper-wired connection between terminals B4 and B5, and between terminals B8 and B4, was made internally to the prepackaging of switch S3. However, in order to enhance versatility, terminals B4 and B8 are also brought to the exterior of terminal board TB3 of switch type S3 shown in FIG. 1. Correspondingly, the total number of terminals of terminal board TB3 of switch S3 that are exposed in implementing the DPDT switch function is shown in FIG. 1 to be ten, and not the minimal eight.

Finally, the common circuit of the present invention may be connected to implement the DPST switch function. It is necessary that both input signals be received at a relay pair, either relay pair RE1, RE3 or relay pair RE2, RE4, that is switched in common. In the sample connection illustrated in FIG. 8, signals AC IN POLE 1 and AC IN POLE 2 are respectively received at terminals B9 and B5, and are switched simultaneously by relay pair RE2, RE4 to respectively appear at terminal B10 and B6 as respective signals AC OUT POLE 1 and AC OUT POLE 2. Remembering that terminals B1 and B2 are used for receipt of the input A.C. power, the total number of connections in implementation of the DPST switch function is thus six. This is exactly the number of terminals illustrated in terminal board TP2 within switch S2 shown in FIG. 1.

In accordance with the preceding discussion, certain variations and alternative embodiments of the present invention will be recognized by a practitioner of the art of electrical circuit design. The number of relays that are within, and the number of switched electrical paths that are controlled by, the timer switch system of the present invention could have been as few as one in implementation of the SPST switch function. Further relays in parallel with this one relay can support implementation of the DPST, and any multiple pole single throw (MPST), switch function. Once it is recognized that the common switch circuit of the present invention uses just one ON/OFF control signal in both its normal and complemented form to control sets of relays oppositely, then these relays could be arrayed in sets of three or more, and not necessarily as sets of two. For example, with six total relays the SPST through 3PST function could be implemented without internal jumpers. Up to the 6PST function could be implemented if all six relays were driven in common by one only, the normal or the inverted, state of the ON/OFF control signal.

It will further be recognized by a practitioner of the art of electrical circuit design that the location of the power supply within the circuit modules S1–S4 in accordance with the present invention is arbitrary, and that the power supply could have as well been located within the timer modules T1 T3. The provision of the ON/OFF control signal in both normal and complemented states along two signal paths from the timers T1–T3 to the switches S1–S4 is arbitrary, and the signal could have been transmitted on a single line with a signal inversion occurring (for implementation of the DPDT switch function) within the switches S1–S4 as required. The break before make in this embodiment would be implemented by means of a hardware delay if desired.

It will be further recognized that the mode and manner of timer control, and of the interface to the operator at the control panels, of the timers is in part accomplished by software, or firmware, and is correspondingly readily subject to variation. The use of switches of an alternative type to the preferred pushbutton switches is possible while still remaining within the scope of the present invention to multiplex, at different times, manual actuations of some of the same switches so as to produce data inputs, and control inputs, to different timer processes. The detailed nature of the timer control panels should not obscure the mode-based timer control interface of the present invention, nor the clear display of both entered data and current switch ON/OFF status which is conveniently accorded the timer switch system programmer and maintainer.

Figure 9:
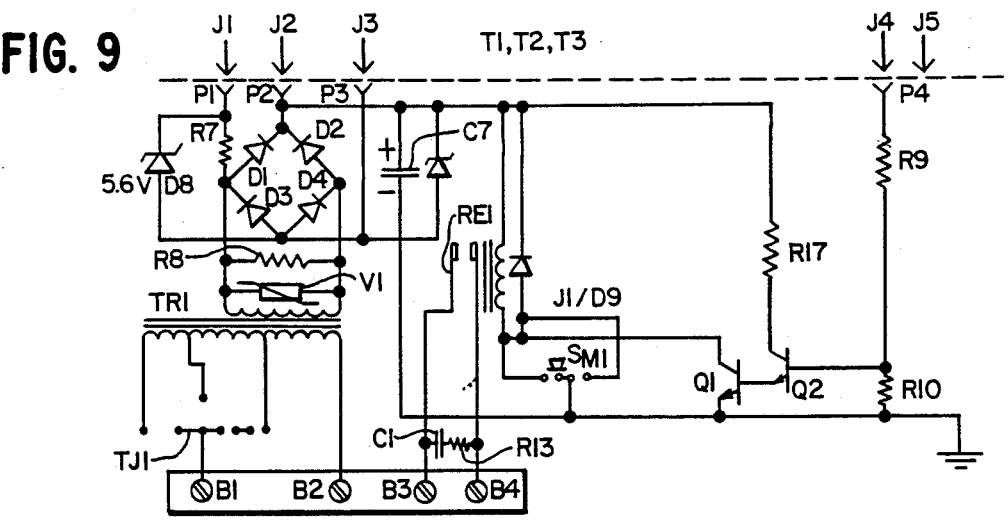
FIG. 9 illustrates a single pole, single throw switch module usable with the timer modules.

As an alternate to the multifunction module of FIG. 7, FIGS. 9–12 illustrate single function switch modules usable with the timer modules T1, T2 or T3. With respect to FIG. 9, a single pole, single throw switch module is illustrated. The switch module of FIG. 9 is supported by the members L2 carried on the switch module S1. The switch module L2 has the advantage that it implements a single pole, single throw switch function using only the minimum amount of hardware required for that function.

The switch module of FIG. 9 also includes the manually operable switch SM1 which can be operated manually subsequent to removeable of the respective timer module to actuate the load connected between the terminals B3 and B4.

Figure 10:
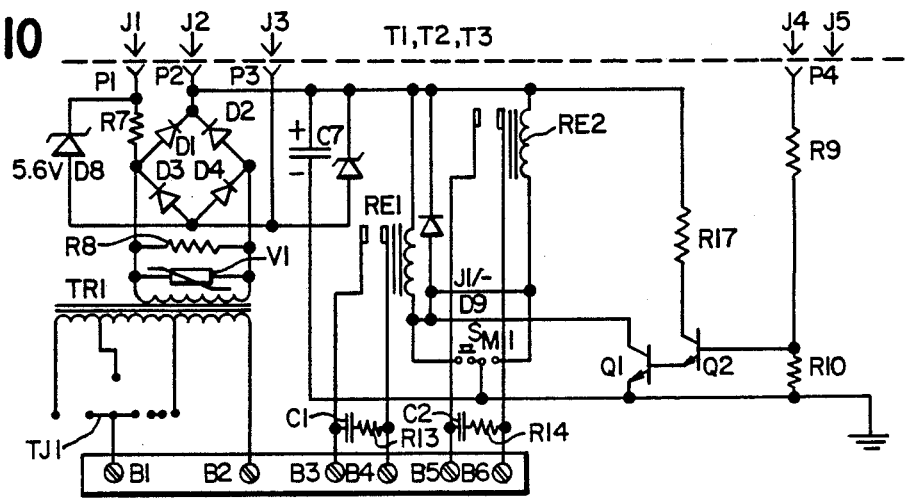
FIG. 10 illustrates a double pole, double throw switch module usable with the timer modules.

FIG. 10 illustrates circuitry for a double pole, double throw switch module which can be utilized with the timers T1, T2 or T3. As in the case of the single pole, single throw module of FIG. 9, the double pole, single throw module of FIG. 10 includes only the necessary hardware to implement that particular switching function.

Figure 11:
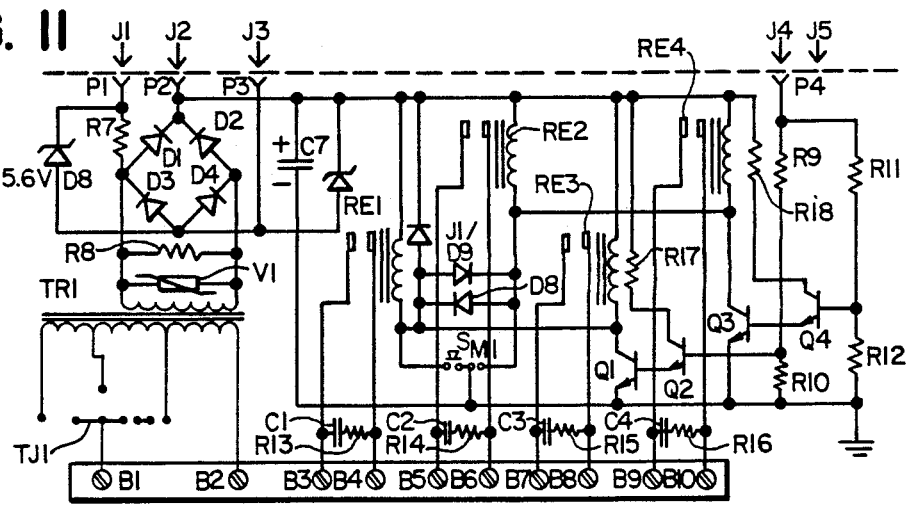
FIG. 11 illustrates a four pole, single throw switch module utilizable with the timer modules.

FIG. 11 illustrates a four pole, single throw switch module utilizable with the timer T1, T2 or T3. As is the case with the single pole, single throw module of FIG. 9, the four pole, single throw module of FIG. 11 uses only the necessary hardware to implement that function.

Figure 12:
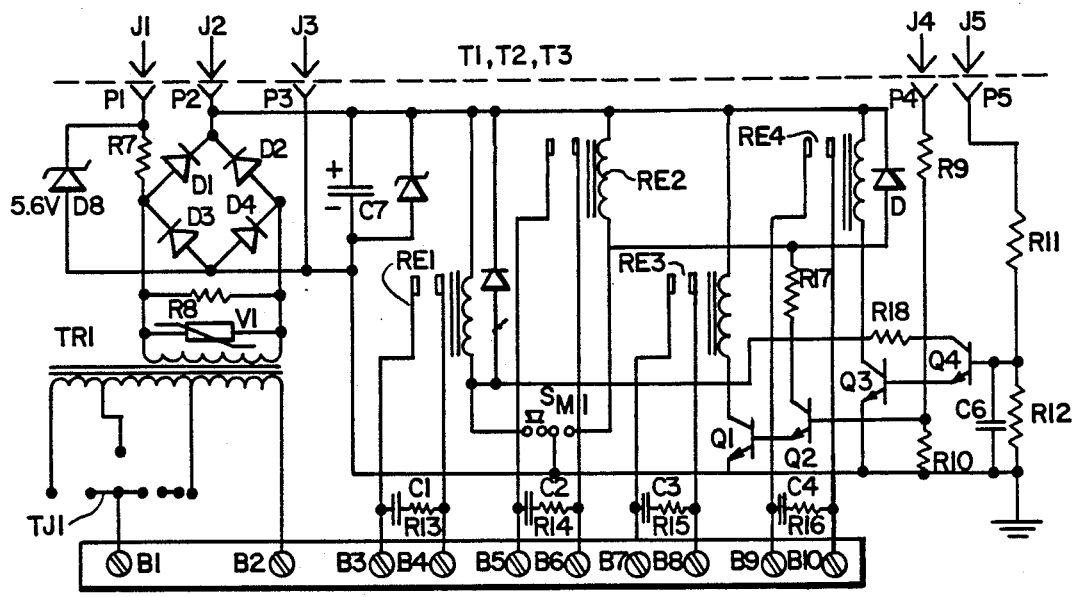
FIG. 12 illustrates a double pole, double throw switch module usable with the timer modules.

FIG. 12 illustrates a double pole, double throw switch module usable with timer units T1, T2 and T3. The double pole, double throw module of FIG. 12 also includes a two position manually operable slide switch SM1 usable to manually actuate the relays in the event one of the timers T1, T2 or T3 is not available.

FIGS. 13–18 illustrate the interaction of various indicia of the display unit D2 in modes other than the program mode. The program mode was previously discussed with respect to FIG. 4b.

Figure 13:
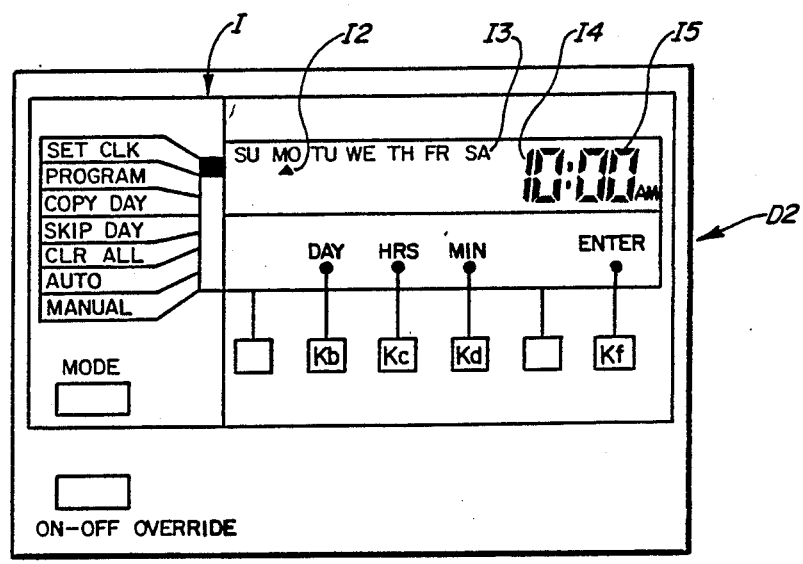
FIG. 13 illustrates the display of the current day in the set clock mode.

In the set clock mode, FIG. 13, indicium I2 illustrates the current day. The day can be adjusted by depressing the key $K_B$. Indicium I3 illustrates the plurality of available days of the week. Indicium I4 displays the current setting of the time in hours. The time in hours can be adjusted by depressing the key $K_C$. Indicium I5 illustrates the current time in minutes. The minutes displayed can be adjusted by depressing the key $K_D$. Finally, when the composite indicium of I4 and I5 corresponds to the correct hour and minute display the enter key $K_F$ can be depressed. The time is then entered into the computer's memory.

Figure 14:
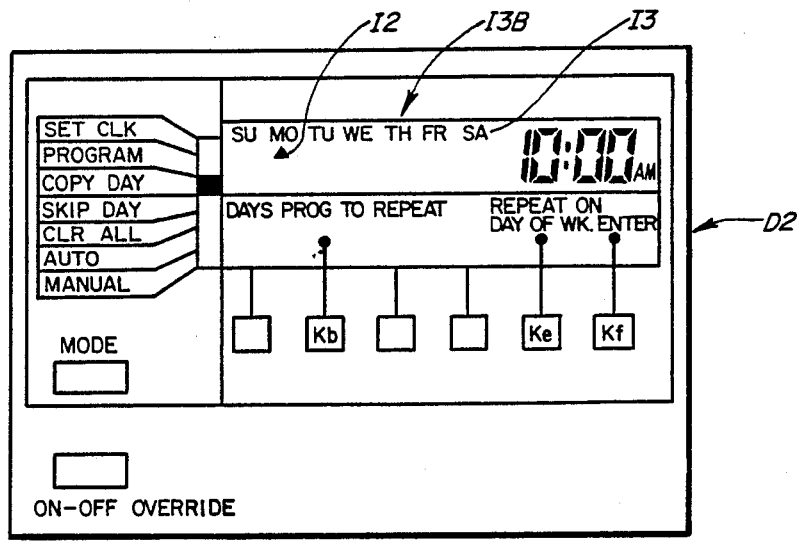
FIG. 14 illustrates the display in the copy day mode.

FIG. 14 illustrates the display D2 in the copy day mode. The day whose program is to be repeated can be selected by depressing the key $K_B$. Each depression of the key $K_B$ moves the indicium I2 under another one of the plurality of indicia I3 for the various days of the week. When the indicium I2 is under the selected day of the week, the key $K_B$ can be depressed to define the day of the week into which the previously selected program is to be copied. The selected day of the week is indicated by a blinking indicium I3B. The indicium I3B continues to blink until the enter key $K_F$ is depressed. At that point, the program from the day defined by the indicium I2 is copied into the day defined by the indicium I3B.

Figure 15:
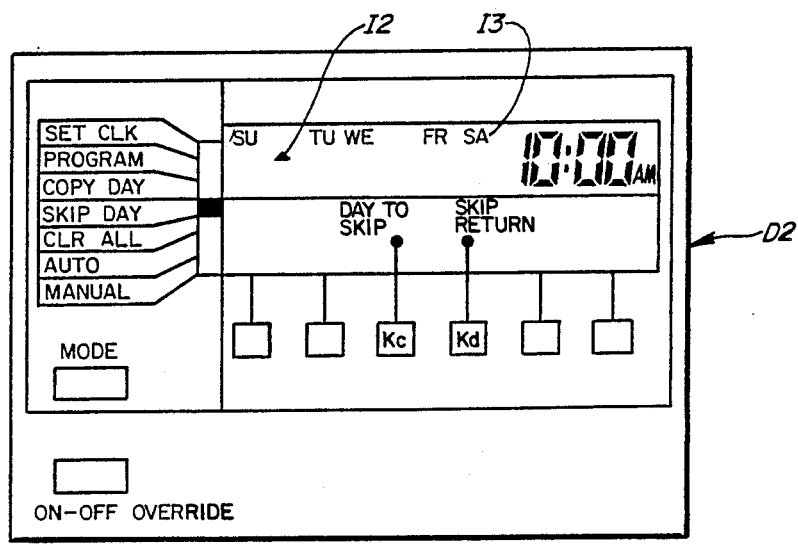
FIG. 15 illustrates the display in the skip day mode.

FIG. 15 illustrates the display D2 in the skip day mode. In the skip day mode, the indicium I2 can be moved under each of the members of the plurality of indicium I3, which defines various days of the week, until a day to be skipped is arrived at. At that time the key $K_C$ can be depressed thereupon the selected indicium of a day, above the indicium I2 disappears indicating that the day will be skipped. To exit, the key $K_D$ can be depressed.

Figure 16:
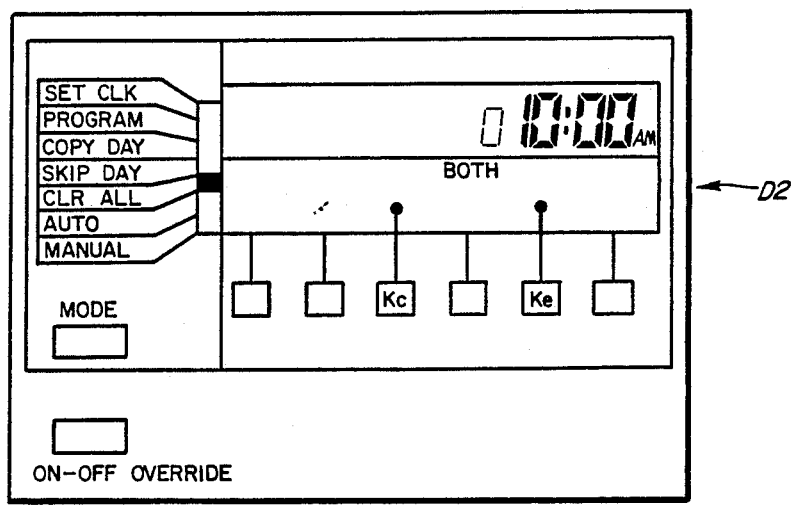
FIG. 16 illustrates the clear all mode of the display.

The display D2 associated with the clear all mode is illustrated in FIG. 16. As illustrated in the clear all mode, the display D2 displays the prompt or instruction "BOTH" with an indicium indicated for key $K_C$ and an indicium indicated for $K_E$. In this mode, both $K_B$ and $K_E$ must be depressed simultaneously to clear the program from memory.

Figure 17:
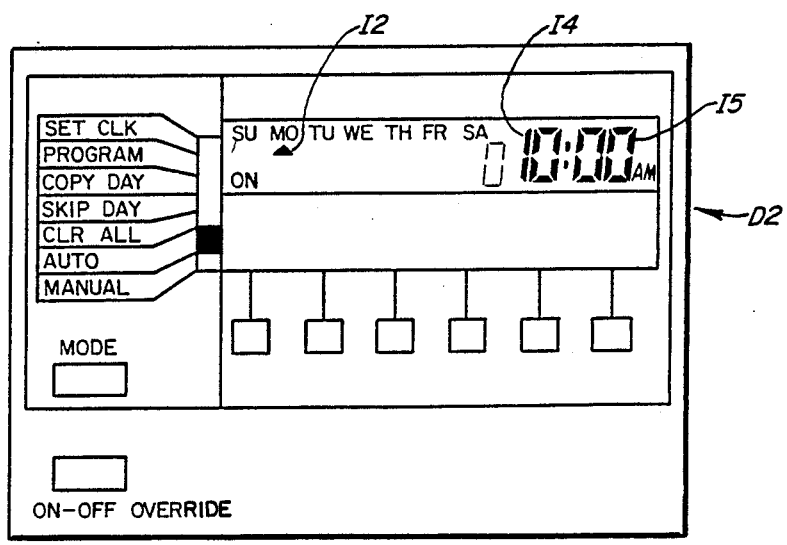
FIG. 17 illustrates the display when the auto mode is selected.

FIG. 17 illustrates the display D2 when the auto mode is selected. In this mode, the prestored event program is automatically executed. The indicium I2 illustrates the day of the week, the indicium I4 and I5 illustrate the time, hours and minutes.

Figure 18:
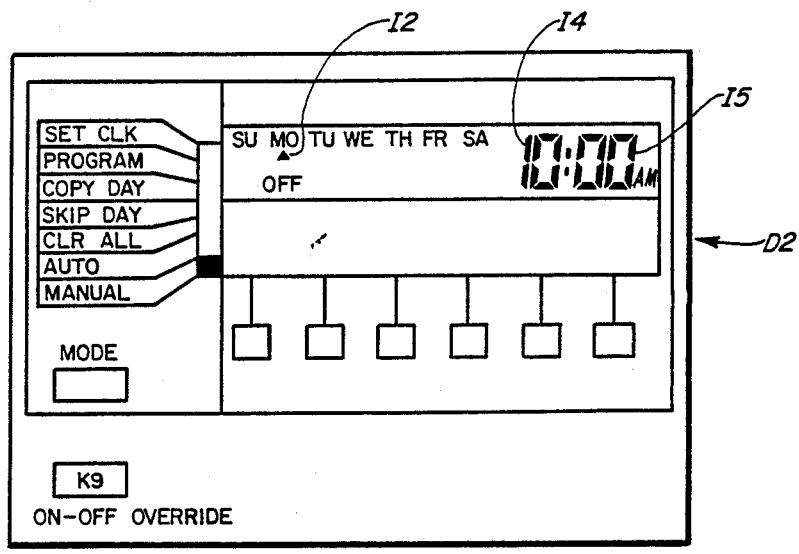
FIG. 18 illustrates the display when in the manual mode.

FIG. 18 illustrates the display D2 when in the manual mode. In the manual mode, the prestored program is not being executed. The on/off override switch K9 can be used to control the output of the associated switch module. In this mode the indicium I2 displays the day of the week and the indicia I4 and I5 display the time in hours and minutes.

Figure 19:
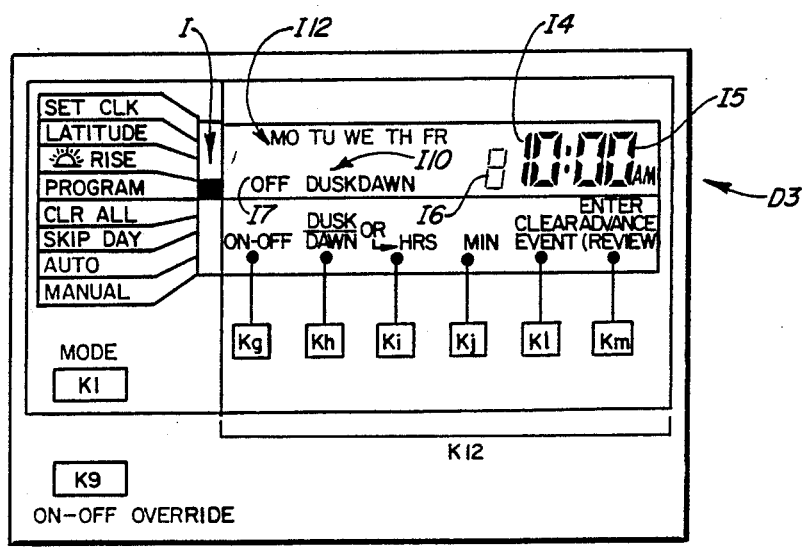
FIG. 19 illustrates the display when the timer is in a program mode.

FIG. 19 illustrates the display D3 when the timer T3 is in a program mode. In this mode, a plurality of keys K12 can be used to enter programming information. A key $K_G$ can be used to define an on or off status of an event. The selected status of the event is illustrated by an indicium I7. A key $K_H$ can be used to define a dusk or dawn initiation of an event as illustrated by a dusk or dawn indicium I10.

Figure 20:
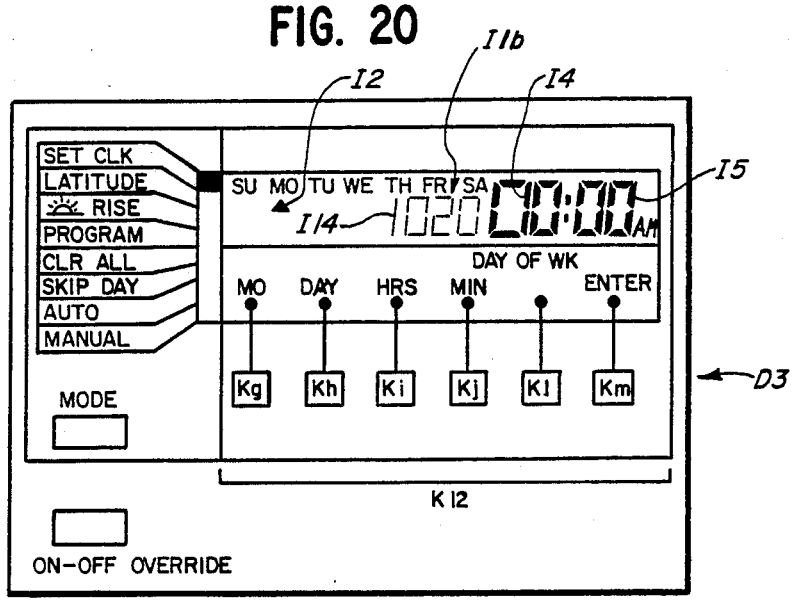
FIG. 20 illustrates the display in the set clock mode.

Alternately, an event can be programmed to initiate at selected hours and minutes of a day by means of keys $K_I$ and $K_J$. The selected hours and minutes are illustrated by the indicia I4 and I5. The days being programmed are illustrated by a plurality of indicia. I12 indicating either Monday through Friday or Saturday and Sunday. A predefined event can be cleared utilizing a key $K_L$. Finally, an entered event to be programmed can be entered by depressing a key $K_M$. When so entered, the number of the event is indicated by an indicium I6. FIG. 20 illustrates the display D3 in the set clock mode. In this mode, the day is identified by an indicium I2. The hours and minutes are defined by indicia I4 and I5. A month can be set utilizing key $K_G$ and displayed by indicium I14. The date, in terms of the day of the month, can be set utilizing the key $K_H$ and displayed by an indicium I16. The hours and minutes can be set using keys $K_I$ and $K_J$ and displayed by indicia I4 and I5. The day of the week can be set by key $K_L$. Finally, the entered month, day, time and day of the week can be stored by depressing the key $K_M$.

Figure 21:
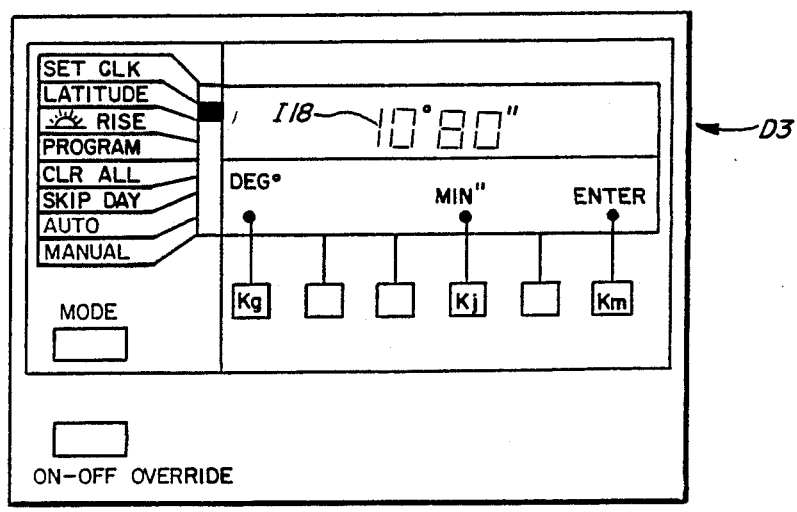
FIG. 21 illustrates the display in the latitude mode.

For purpose of setting the astronomical clock, FIG. 21 illustrates the related display D3. In FIG. 21, the display D3 is in the latitude mode. In this mode, the display D3 specifies that keys $K_G$ and $K_J$ are to be used to enter degrees and minutes respectively. The entered degrees and minutes are displayed by an indicium I18. The indicium I18 can be entered into the computer memory by depressing the enter key $K_M$.

Figure 22:
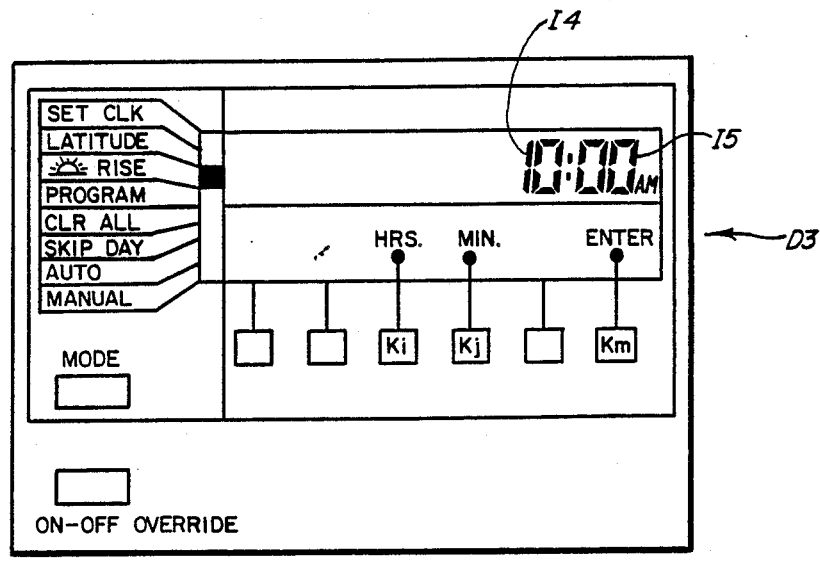
FIG. 22 illustrates the display in the sunrise mode.

FIG. 22 illustrates the display D3 when in the sunrise mode. In the sunrise mode, the time of sunrise can be set. In this mode, the display D3 defines keys $K_I$ and $K_J$ for the purpose of entering sunrise hour and minutes which in turn are displayed by the indicia I4 and I5. The entered sunrise hour and time can be entered into the computer memory using the defined enter key $K_M$. An off-set can also be entered in the sunrise or sunset modes.

Figure 23:
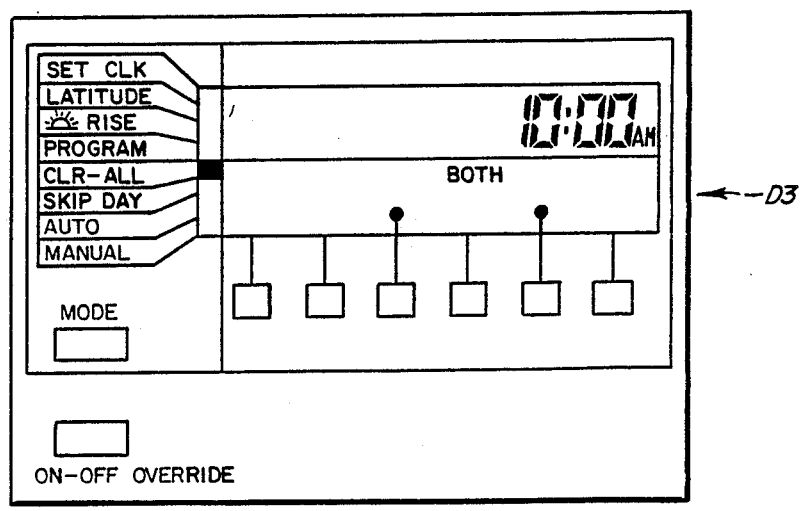
FIG. 23 illustrates the display in the clear all mode.

FIG. 23 illustrates the display D3 in the clear all mode. Timer T3 and display D3 function identical to the clear all mode for timer T2 and display D2 previously described with respect to FIG. 16.

The display D3 is operable in the skip a day mode. The skip a day mode for the timer T3 and the display D3 functions the same as the skip a day mode and display of timer T2, display D2 of FIG. 15.

The display D3 and timer T3 also have an auto mode for execution of the previously entered event timing program. The display D3 corresponds to the display D2 in the auto mode. Similarly, the display D3 corresponds to the display D2 in the manual mode previously discussed.

The displays D2 and D3 thus provide a step-up assisting approach to help an operator successfully carry out a selected function. The use of displayable symbols or labels results in a given key having different functions at different times. As a result, a relatively few keys is needed to carry out a plurality of different operations.

In accordance with these and other possible alternative embodiments of the present invention, the scope of the present invention should be determined by the following claims, only, and not solely in accordance with those particular preferred embodiments within which the invention has been taught.

What is claimed is:

1. A modular system for switching a load comprising:
   programmable control means including manually actuatable means for entry of selected information, electro-optical display means having first and second parts with said first part coupled to said control means for displaying visual, operator assisting indicia in response to manual actuation of selected of said entry means, with said second part coupled to said control means for displaying operator visible indicia related to said entered information, said control means further including means for generating at least one electrical signal having a plurality of time varying states related to selected of said entered information; and
   modular means, for receiving said one electrical signal, and couplable to said control means for switching the load in response to said signal
   said modular switching means having load connector means and removably engageable with the load with
   said modular switching means selected from a class containing at least a single pole single throw switch function; a double pole single throw switch function; and a double pole double throw switch function.

2. A modular system as in claim 1 with said control means including first connector means, said modular switching means including second connector means, said first and said second connector means being removably engageable.

3. A modular system as in claim 2 with said control means removable from said modular switch means for programming.

4. A modular system as in claim 1 including mode selecting means defining a programming mode with said control means energizing said first part with event programming related indicia.

5. A modular system as in claim 4 with said control means energizing said second part to display indicia related to actuation of selected elements of said entry means in response to said indicia displayed on said first part.

6. An easily programmable load switching system comprising:
   electro-optical display means with first and second parts, a plurality of operator assisting symbols and key defining symbols displayable on said first part, a plurality of entered information confirming indicia displayable on said second part;
   manually operable information entry means including a plurality of manually operable keys;
   load switching means;

control means coupled to said two part display means, said entry means and said switching means, said control means including means for sensing a manually selected programming mode;

means for receiving key entered time and event sequence related information;

means for processing the entered information and displaying indicia on said second part confirmatory of receipt thereof;

means for sensing a manually entered information storage indicium;

means for sensing a manually selected automatic mode; and means for executing the entered time and event sequence related information;

with said switching means switching an exterior load in response to the executed information and with said switching means selected from a class containing at least a single pole single throw switch function; a double pole single throw switch function; and a double pole double throw switch function.

7. A modular system engageable with circuitry for switching a load comprising:

a closeable housing;

manually actuatable means for entry of selected information;

control means coupled to said entry means;

electro-optical display means having first and second parts with said first part coupled to said control means for displaying visual, operator assisting indicia in response to manual actuation of selected of said entry means, with said second part coupled to said control means for displaying operator visible indicia related to said entered information, said control means further including means for generating at least one electrical signal having a plurality of time varying states related to said entered information;

a second housing, slidably receivable in said closeable housing, with said entry means, said control means and said display means carried therein; and means, slidably receivable within said closeable housing, plug engageable with said second housing for receiving said one electrical signal, and couplable to the switching circuitry for switching the load in response to said signal.

8. A modular system as in claim 7 with the load switching circuitry including a switching circuit connector, said control means including first connector means, said first connector means removably engageable with the switching circuit connector.

9. A modular system as in claim 8 with said control means disengageable from the switching circuitry for programming.

10. A modular system as in claim 7 including mode selecting means defining a programming mode with said control means energizing said first part with event programming related indicia.

11. A modular system as in claim 10 with said control means energizing said second part to display indicia related to actuation of selected elements of said entry means in response to said indicia displayed on said first part.

12. An easily programmable system engageable with load switching circuitry and comprising:

a closeable exterior housing with the load switching circuitry removable carried therein;

electro-optical display means with first and second parts, a plurality of operator assisting symbols and key defining symbols displayable on said first part, a plurality of entered information confirming indicia displayable on said second part;

manually operable information entry means including a plurality of manually operable keys;

control means coupled to said display means, and said entry means, said control means including means for sensing a manually selected programming mode;

means for receiving key entered time and event sequence related information;

means for processing the entered information and displaying indicia on said second part confirmatory of receipt of that information;

means for sensing a manually selected automatic mode;

means for executing the entered time and event sequence related information;

a closed interior housing which contains said display means, said information entry means and said control means with said interior housing removably receivable within said closeable exterior housing; and connector means, carried by said interior housing and engageable with the load switching circuitry for switching an exterior load in response to the entered information.

13. A modular system for switching a load comprising:

a housing;

programmable control means, removably carried in said housing, including manually actuatable means for entry of selected information, electro-optical display means having first and second parts with said first part coupled to said control means for displaying visual, operator assisting indicia in response to manual actuation of selected of said entry means, with said second part coupled to said control means for displaying operator visible indicia related to said entered information, said control means further including means for generating at least one output electrical control signal having a plurality of time varying states related to selected of said entered information with said control means carrying first connector means;

modular means for switching the load including at least one control input and removably carried in said housing, said switching means having second and third different connector means, with said first and said second connector means being plug engageable, said third connector means removably engageable with the load and with said output electrical control signal coupled to said control input via said first and second connector means for switching the load in response thereto.

14. A modular system for switching a load as in claim 13 with a switching function of said switching means selected from a class including a single pole, single throw switch function; a double pole, single throw switch function; and a double pole double throw switch function.

15. A modular system for switching a load as in claim 13 with said third connector means including a plurality of screw terminals connectable with the load.

16. A modular system for switching a load as in claim 13 with said first and said second connector means including slidably engageable electrical connectors for disengagement of said programmable control means from said modular switching means and said housing.

17. A modular system for switching a load as in claim 14 with said switching functions implementable in a single switch module.

18. A modular system for switching a load as in claim 13 with said control means carried in a second housing slidably containable within said housing.

19. A modular system for switching a load as in claim 18 with said second housing carrying a removable battery.

20. A modular system for switching a load as in claim 19 with said battery accessible and replaceable while said second housing is contained within said housing.

21. A modular system for switching a load as in claim 13 including a closeable cover for said housing.

* * * * *